(12) United States Patent
Jordan et al.

(10) Patent No.: US 11,060,647 B2
(45) Date of Patent: Jul. 13, 2021

(54) PIPE FITTINGS

(71) Applicant: Hubbell Incorporated, Shelton, CT (US)

(72) Inventors: David Scott Jordan, Tulsa, OK (US); Donald Wayne Wartluft, Tulsa, OK (US)

(73) Assignee: HUBBELL INCORPORATED, Shelton, CT (US)

(*) Notice: Subject to any disclaimer, the term of this patent is extended or adjusted under 35 U.S.C. 154(b) by 481 days.

(21) Appl. No.: 15/644,549

(22) Filed: Jul. 7, 2017

(65) Prior Publication Data

US 2018/0017196 A1 Jan. 18, 2018

Related U.S. Application Data

(60) Provisional application No. 62/361,299, filed on Jul. 12, 2016.

(51) Int. Cl.
| | | |
|---|---|---|
| *F16L 37/092* | (2006.01) | |
| *F16L 41/02* | (2006.01) | |
| *F16L 43/00* | (2006.01) | |

(52) U.S. Cl.
CPC ......... *F16L 37/0925* (2013.01); *F16L 41/021* (2013.01); *F16L 43/00* (2013.01)

(58) Field of Classification Search
CPC .... F16L 37/0925; F16L 37/0926; F16L 47/12
USPC ................................................. 285/323, 371
See application file for complete search history.

(56) References Cited

U.S. PATENT DOCUMENTS

| | | | |
|---|---|---|---|
| 3,741,591 | A | 6/1973 | Fessler et al. |
| 5,002,318 | A | 3/1991 | Witter |
| 5,267,757 | A | 12/1993 | Dal Palu |
| 5,366,260 | A | 11/1994 | Wartluft |
| 5,524,940 | A | 6/1996 | Wartluft |
| 5,547,228 | A | 8/1996 | Abbema et al. |
| 5,609,370 | A | 3/1997 | Szabo et al. |
| 5,692,785 | A | 12/1997 | Wartluft et al. |
| 5,791,698 | A | 4/1998 | Wartluft et al. |
| 5,853,272 | A | 12/1998 | Wartluft et al. |
| 5,918,914 | A | 7/1999 | Morris |
| 5,975,587 | A | 11/1999 | Wood et al. |
| 6,050,613 | A | 4/2000 | Wartluft |

(Continued)

FOREIGN PATENT DOCUMENTS

| | | | | |
|---|---|---|---|---|
| EP | 1972844 A1 | * | 9/2008 | .......... F16L 37/0925 |
| JP | 2003097785 A | * | 0/2000 | .......... F16L 37/0926 |

OTHER PUBLICATIONS

International Search Report and Written Opinion mailed in corresponding application PCT/US17/41225 dated Nov. 17, 2017.

(Continued)

*Primary Examiner* — Zachary T Dragicevich
(74) *Attorney, Agent, or Firm* — Wissing Miller LLP

(57) ABSTRACT

Stab-type pipe fittings capable of being inserted onto plastic pipes are provided. The pipe fittings have an outer casing with pipe ports, a hollow inner casing positioned within the outer casing, a pipe gripper and stiffener positioned within the inner casing. The pipe ports have an elongated lip that straightens a pipe inserted into the fitting. The stiffener provides a multi-compression seal to facilitate the leak proof connection.

15 Claims, 18 Drawing Sheets

(56) References Cited

U.S. PATENT DOCUMENTS

| | | | |
|---|---|---|---|
| 6,142,538 A * | 11/2000 | Volgstadt | F16L 37/0925 |
| | | | 285/323 |
| 6,877,777 B1 | 4/2005 | Wartluft | |
| 7,069,958 B2 | 7/2006 | Filho et al. | |
| 7,210,504 B2 | 5/2007 | Filho et al. | |
| 8,925,978 B2 | 1/2015 | Jamison et al. | |
| 2004/0017082 A1 | 1/2004 | Lukach, Jr. | |
| 2005/0035597 A1* | 2/2005 | Bamberger | F16L 37/0925 |
| 2015/0323183 A1* | 11/2015 | Butcher | |
| 2017/0102102 A1* | 4/2017 | Goble | |

OTHER PUBLICATIONS

Continental Industries Catalog: Gas Distribution Products, Con-Stab ID Seal (R) Fittings, 40 pages, Mar. 2016.

* cited by examiner

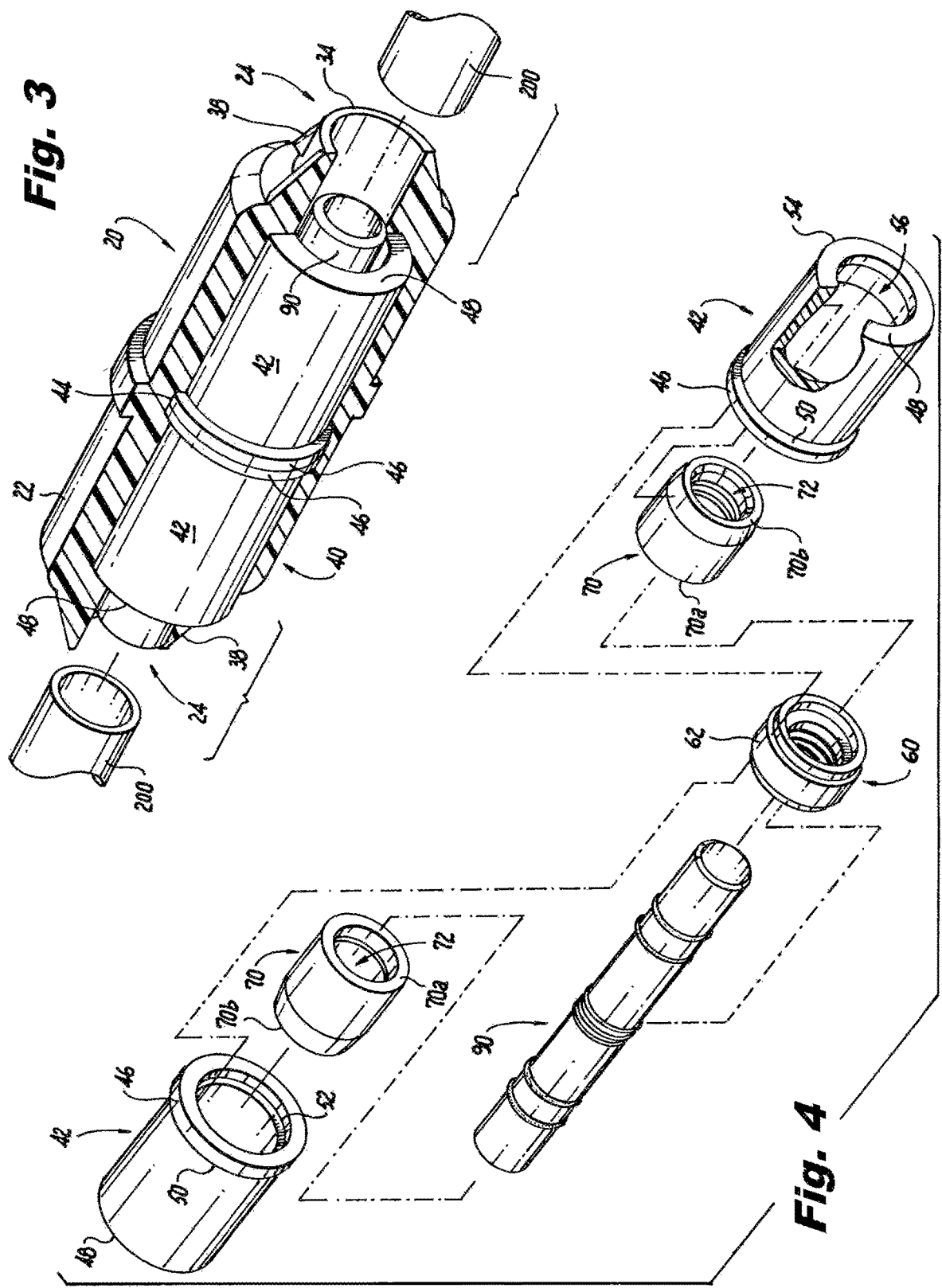

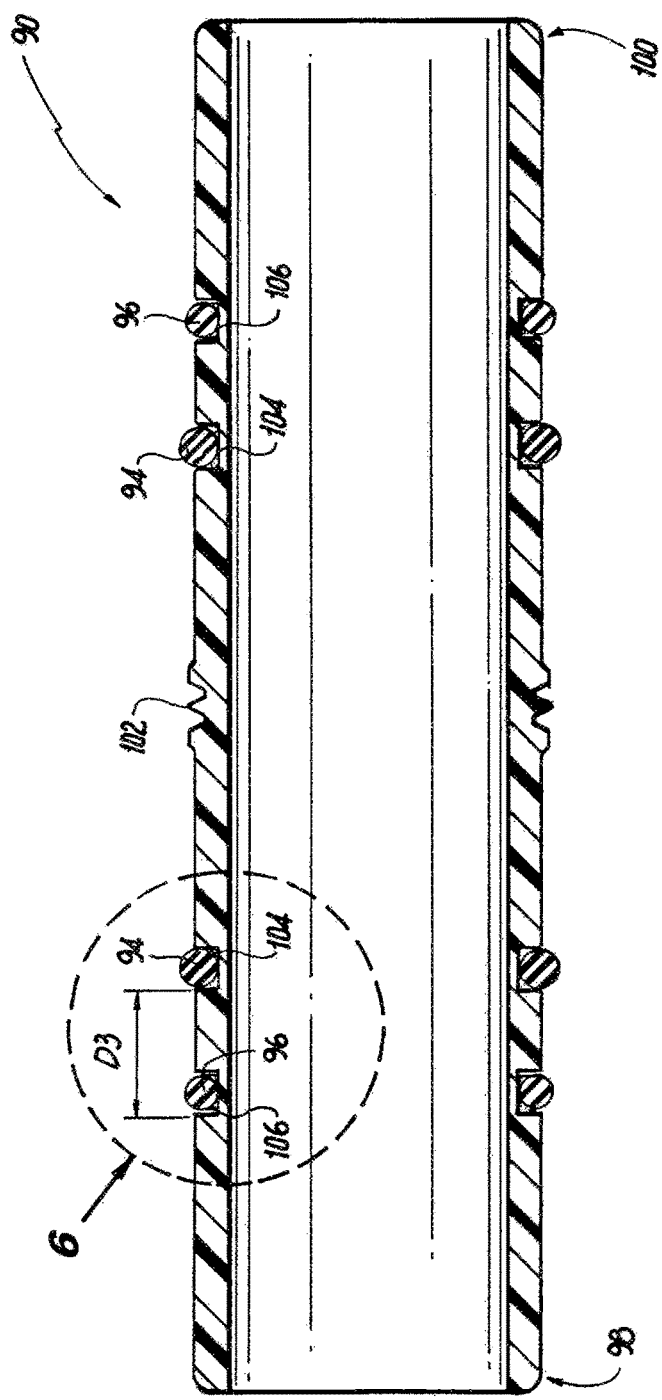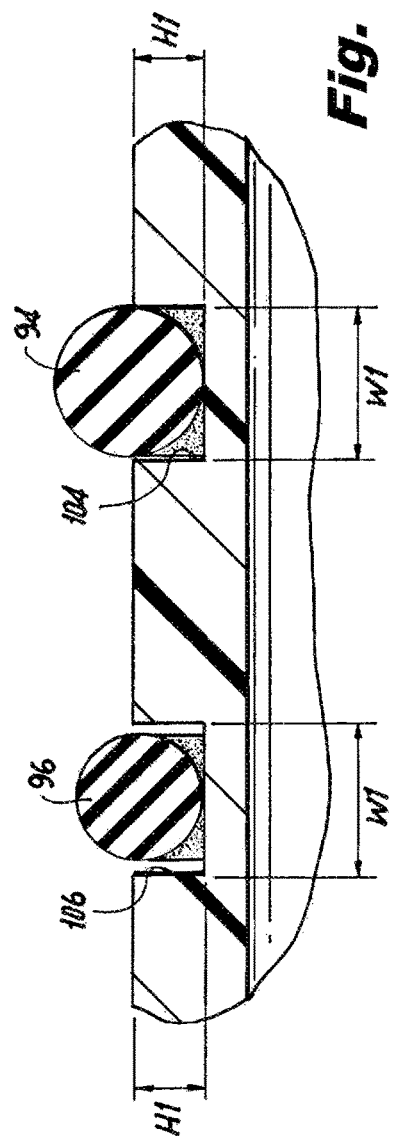

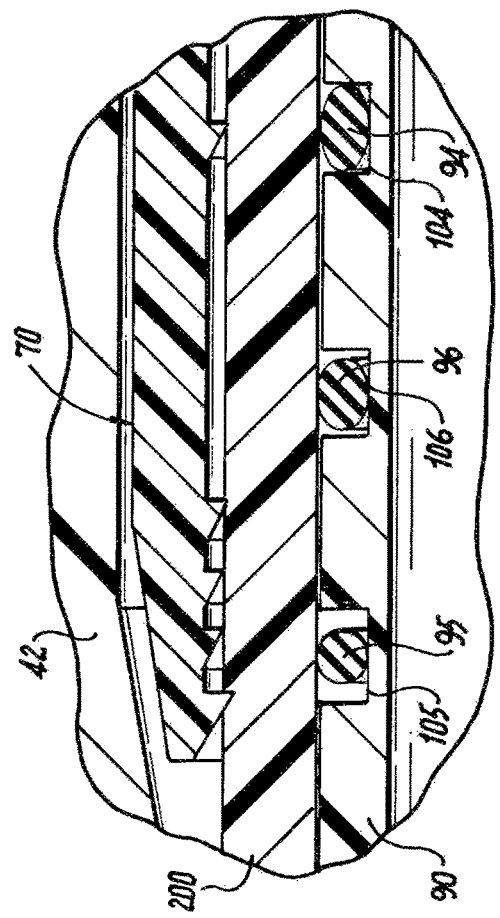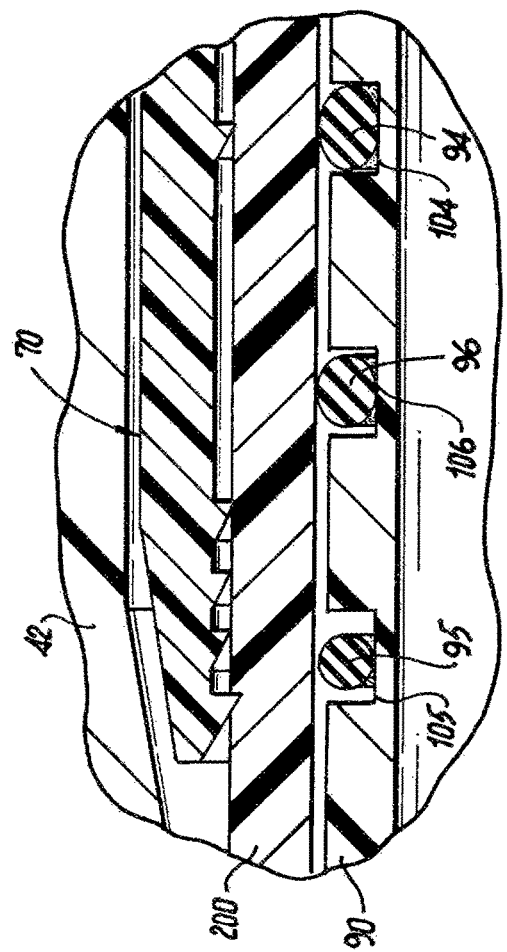

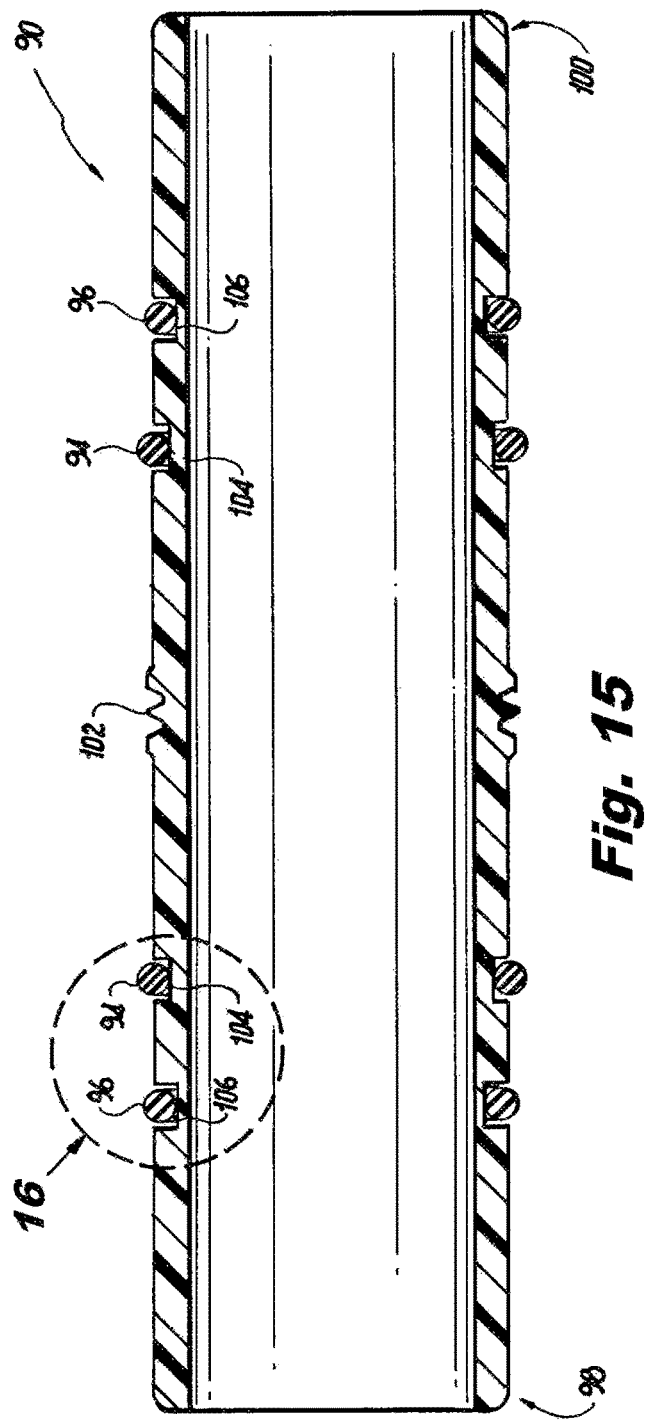
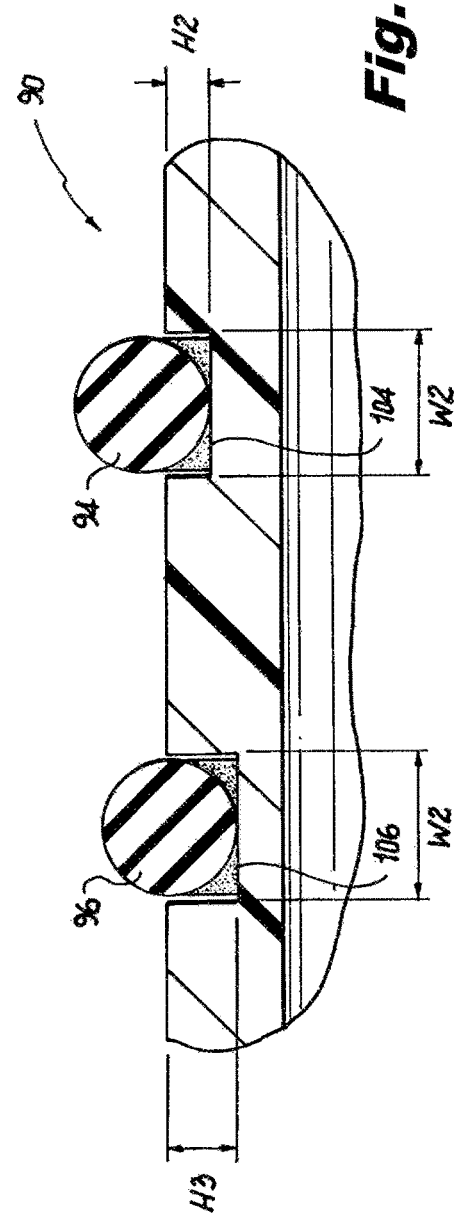

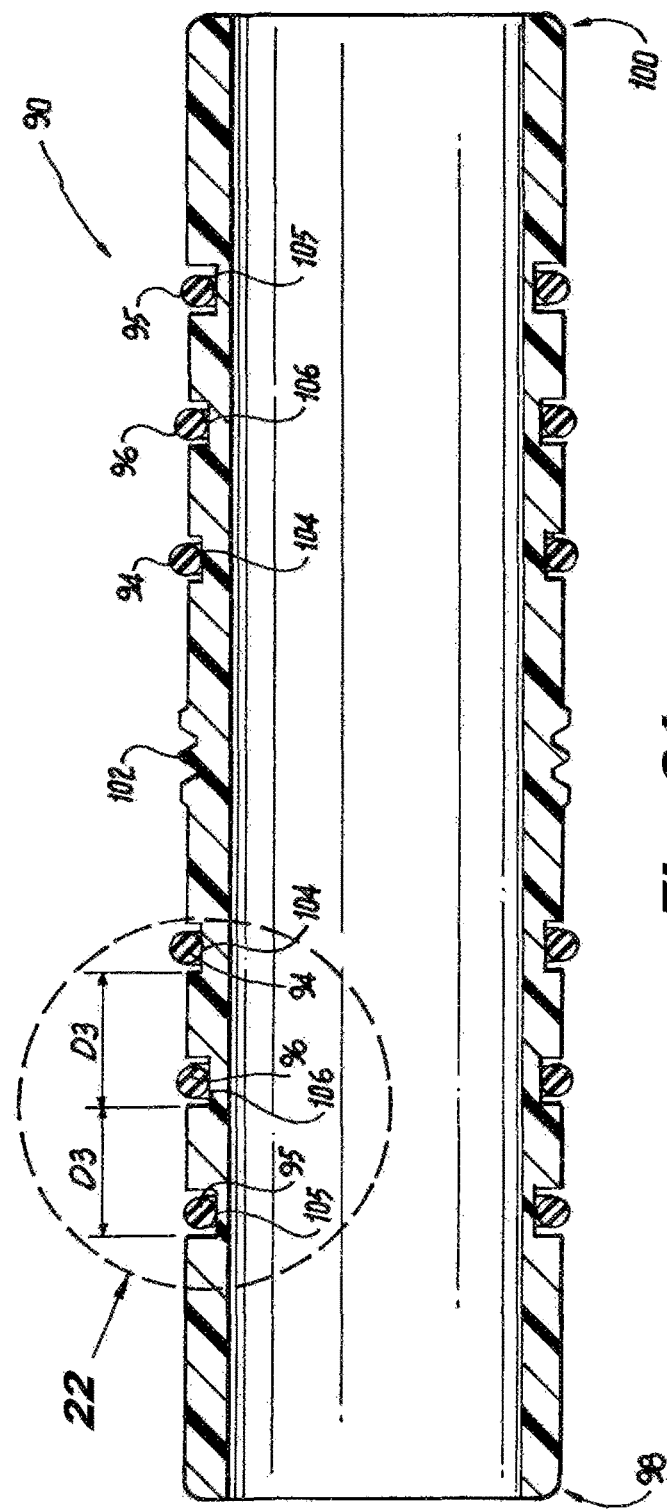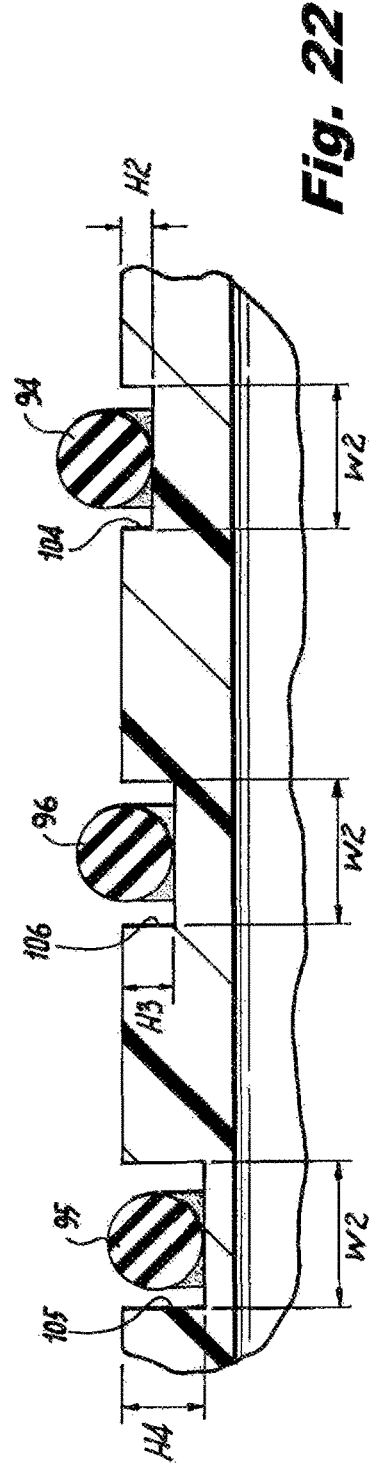

PIPE FITTINGS

CROSS REFERENCE TO RELATED APPLICATIONS

The present application is based on and claims benefit from U.S. Provisional Application Ser. No. 62/361,299 filed Jul. 12, 2016 entitled "Pipe Fittings" the entire contents of which are herein incorporated by reference.

BACKGROUND

Field

The present disclosure relates to stab-type pipe fittings designed to couple one or more plastic pipes to a fitting, and more particularly to stab-type pipe fittings with an improved seal between the fitting and the pipe.

Description of the Related Art

Stab-type pipe fittings are designed to be inserted manually onto the end of a length of plastic pipe or between lengths of plastic pipes. Generally, due to mechanisms within stab-type fittings, after a fitting is inserted onto a length of plastic pipe the fitting is not intended to be pulled off of the pipe, such that the way to remove the fitting is to cut the pipe. Thus, stab-type pipe fittings are a one-time use pipe fitting that facilitates quick and easy connection to plastic pipes. If properly installed, stab-type pipe fittings form a sealed, leak proof pathway between the plastic pipes inserted into the fittings.

SUMMARY

The present disclosure provides exemplary embodiments of improvements to stab-type pipe fittings that are capable of being inserted onto plastic pipes and provide a leak proof connection. In one exemplary embodiment, the pipe fitting comprises an outer casing having at least one pipe port providing a passageway for a pipe to be passed into the outer casing, a hollow inner casing positioned within the outer casing and having at least one opening aligned with the at least one pipe port, at least one gripper positioned within the inner casing, and a stiffener positioned at least partially within the inner casing and the at least one gripper opening. The at least one pipe port comprises an elongated lip and a port opening forming at least part of the passageway.

The at least one gripper is positioned within the inner casing and has an opening aligned with the at least one pipe port. The at least one gripper includes one or more reverse serrations that can flex when a pipe is passed through the at least one gripper opening imparting little resistance to the forward advancement of the pipe into the at least one gripper while imparting sufficient resistance to rearward movement of the pipe to prevent withdrawal of the pipe from the at least one gripper.

The stiffener has at least a pair of sealing members each positioned within a groove in an outer surface of the stiffener such that when a pipe is passed over the stiffener and sealing members the sealing members can contact an interior wall of the pipe to provide a seal between the pipe and the stiffener. In one embodiment, the pair of sealing members have the same diameter and the grooves have different dimensions. In another embodiment, the pair of sealing members have different diameters and the grooves have the same dimensions.

In another embodiment, the stiffener has at least three sealing members each positioned within a groove in an outer surface of the stiffener such that when a pipe is passed over the stiffener and sealing members the sealing members can contact an interior wall of the pipe to provide a seal between the pipe and the stiffener. In one embodiment, the at least three sealing members have the same diameter and the grooves have different dimensions. In another embodiment, the at least three sealing members have different diameters and the grooves have the same dimensions.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 is a perspective view of the pipe fitting of FIG. 1 with a portion of an outer casing removed to reveal an inner casing encased with the outer casing;

FIG. 4 is an exploded view of the inner casing of FIG. 3 revealing a pair of grippers separated by a hub and a stiffener within the inner casing;

FIG. 5 is a cross-sectional view of the stiffener of FIG. 4, illustrating two sealing members positioned around the stiffener;

FIG. 6 is an enlarged view of a portion of the stiffener of FIG. 5, illustrating two sealing members having different diameters in circumferential grooves having the same depth;

FIG. 13 is an enlarged view of a portion of the pipe fitting of FIG. 7 having a stiffener of FIG. 11, illustrating the three sealing members engaging an inner wall of the pipe having the minimum internal diameter;

FIG. 14 is an enlarged view of a portion of the pipe fitting of FIG. 9 having a stiffener of FIG. 11, illustrating the three sealing members engaging an inner wall of the pipes having the maximum internal diameter;

FIG. 15 is a cross-sectional view of another exemplary embodiment of a stiffener according to the present disclosure, illustrating two sealing members positioned around the stiffener;

FIG. 16 is an enlarged view of a portion of the stiffener of FIG. 15, illustrating sealing members have the same diameter in circumferential grooves having different depths;

FIG. 21 is a cross-sectional view of another exemplary embodiment of the stiffener of FIG. 4, illustrating three sealing members positioned around the stiffener;

FIG. 22 is an enlarged view of a portion of the stiffener of FIG. 21, illustrating sealing members have the same diameter in circumferential grooves having different depths;

DETAILED DESCRIPTION

Figure 1:
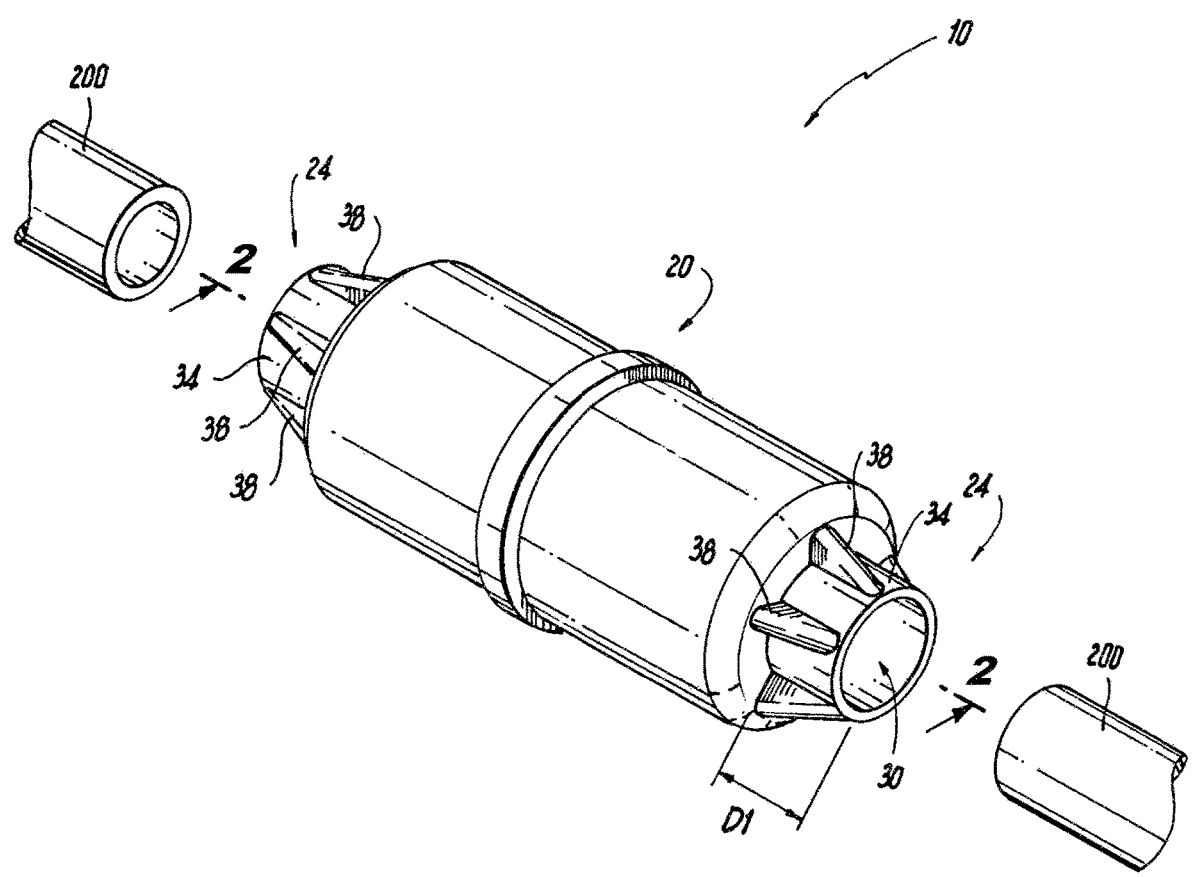
FIG. 1 is a perspective view of an exemplary embodiment of a pipe fitting according to the present disclosure.

The present disclosure provides various embodiments of improvements to stab-type pipe fittings that are capable of being inserted onto plastic pipes and provide a leak proof connection. Exemplary types of the stab-type pipe fittings used to connect to plastic pipe include, but are not limited to, couplers, elbows (also known as "L's"), Tee's, reducers and end caps. Those skilled in the art would readily recognize that the features of the improvements to stab-type pipe fittings disclosed herein may be incorporated into any stab-type pipe fitting, including those noted above. For ease of description, the present disclosure may refer to stab-type pipe fittings as the pipe fitting in the singular or pipe fittings in the plural.

In the exemplary embodiment shown in FIGS. 1-4, the pipe fitting is a coupler used to join two plastic pipes together. Thus, for this part of the description, the pipe fitting will be referred to as the coupler. The coupler 10 includes an outer casing or shell 20, an inner casing or shell 40, one or more grippers 70, and one or more stiffeners 90. The one or more grippers 70 and one or more stiffeners 90 are encased within the inner casing 40 and the inner casing 40 is encased within the outer casing 20.

The outer casing 20 has a body 22 and one or more pipe ports 24. The body 22 has a hollow interior that receives the inner casing 40 to surround the inner components of the coupler 10, as seen in FIG. 3. The body 22 has one or more openings 26 each configured to permit a plastic pipe to pass into the body 22. In the embodiment shown in FIG. 2, the body 22 has two openings 26. It should be noted that for certain types of pipe fittings the body 22 may have more than two openings, such as Tee type pipe fittings, and for other types of pipe fittings the body 22 may have one opening, such as end cap type pipe fittings. The body 22 is made of a sufficiently rigid material to provide a protective casing for the inner components of the coupler 10.

Each of the one or more pipe ports 24, which may also be referred to as a moisture lip, have a center opening 30 and an elongated port lip 34. The center opening 30 is aligned with an opening 26 in the body 22. In the exemplary embodiment of a coupler as the pipe fitting, there are two pipe ports 24. However, it should be noted that for certain types of the pipe fittings the outer casing 20 may have more than two pipe ports 24, such as in Tee type pipe fittings, and in other types of pipe fittings the outer casing 20 may have one pipe port, such as end cap type pipe fittings. Each pipe port lip 34 may be integrally formed into the outer casing body 22 such that the openings 26 and 30 are one continuous passageway into the outer casing 20, or each pipe port lip 34 may be secured to the outer casing body 22 using, for example, adhesives, welds or mechanical fasteners. Where a pipe port 24 is secured to the outer casing body 22, the center opening 30 is aligned with an outer casing opening 26 to form a passageway into the outer casing 20. Providing a passageway into the outer casing 20 permits a plastic pipe to pass from a pipe port 24 through the opening 26 into the outer casing 20, and eventually into the inner casing 40.

As noted, the pipe port lip 34 is an elongated lip that extends from the outer casing body 22. As shown in FIG. 1, each elongated lip 34 extends from the outer casing body 22 a distance D1 that may range from about ⅛ of an inch to about 2 inches. Each pipe port lip 34 is configured to receive a pipe 200, seen for example in FIG. 2, and the elongated nature of the pipe port lip 34 aligns and straightens the pipe 200 as it enters the coupler 10 prior to the pipe passing over the stiffener 90. The elongated pipe port lip 34 also ensures that the pipe 200 remains substantially straight within the coupler 10. By maintaining the straightness of the pipe 200 within the coupler 10, the pipe port lip 34 also ensures that an even radial compression can be maintained between the sealing members of the stiffener 90 and the inner diameter of the pipe 200 even under bending loads. To provide additional structural integrity to each pipe port 24, one or more gussets 38 may be positioned around the perimeter of each pipe port lip 34. The gussets 38 may be integrally formed into the pipe port lip 34 and the outer casing body 22, or the gussets 38 may be secured to the pipe port lip 34 and the outer casing body 22 using, for example, adhesives, welds or mechanical fasteners. To facilitate the described pipe straightening, the pipe port lip 34 and gussets 38, if used, are preferably made of a sufficiently rigid material.

Figure 2:
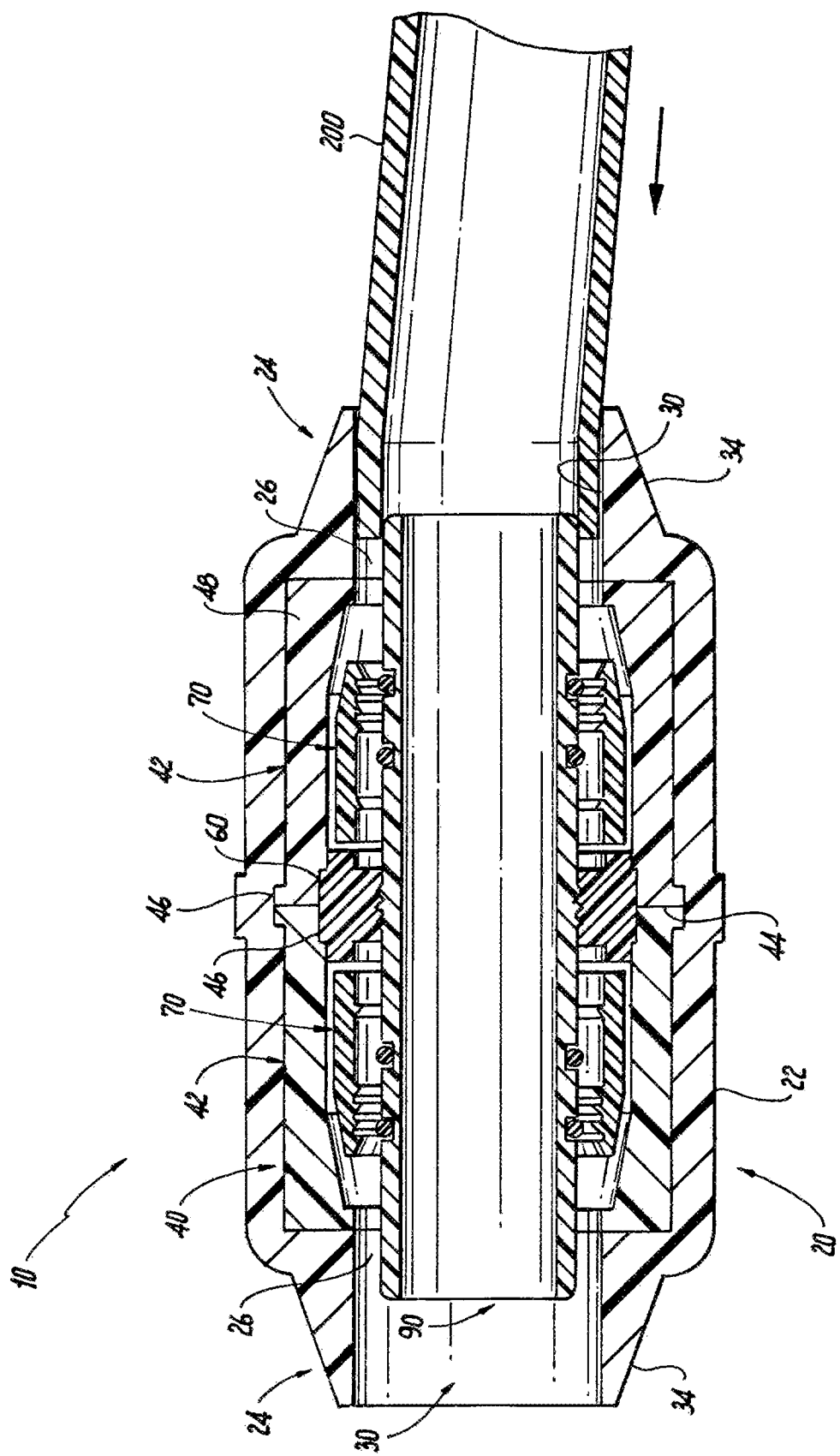
FIG. 2 is a cross-sectional view of the pipe fitting of FIG. 1 taken from line 2-2 and illustrating a pipe being inserted into the fitting.
Figure 19:
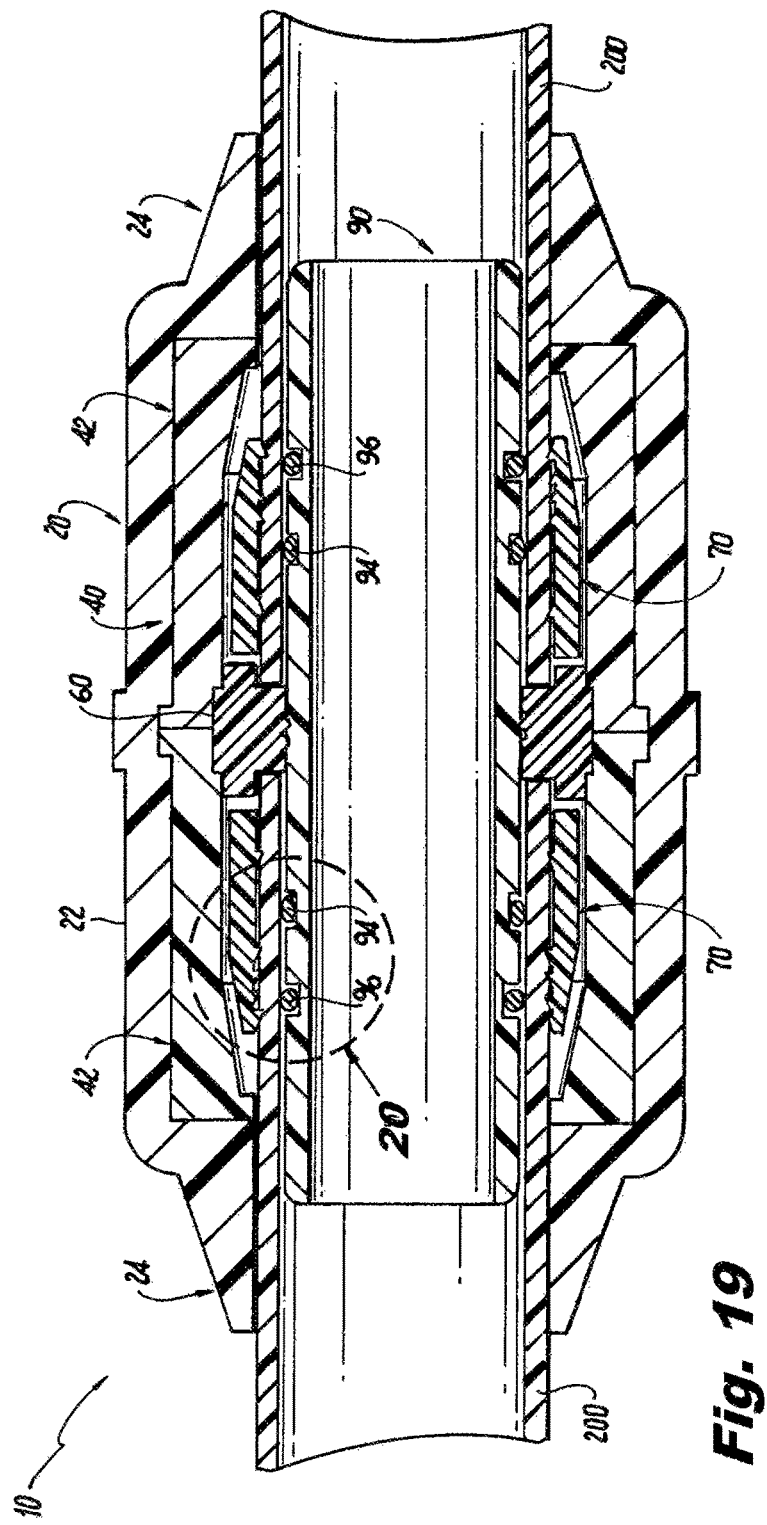
FIG. 19 is a cross-sectional view of the pipe fitting of FIG. 1 and the stiffener of FIG. 15, illustrating pipes having a maximum internal diameter capable of fitting over the stiffener.
Figure 20:
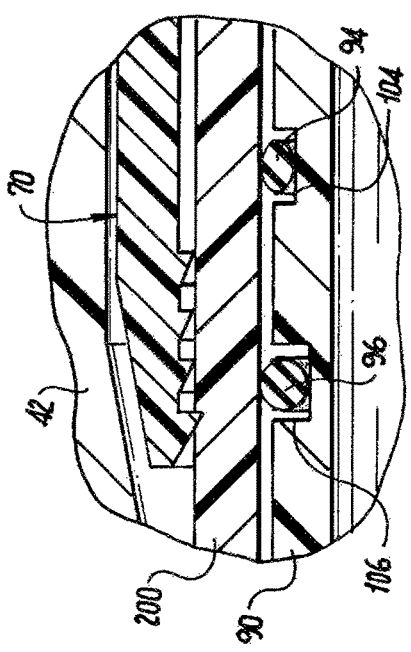
FIG. 20 is an enlarged view of a portion of the pipe fitting of FIG. 19, illustrating the two sealing members engaging an inner wall of the pipes having the maximum internal diameter.

Referring to FIGS. 2 and 4, as noted, the inner casing 40 of the coupler 10 encases the gripper 70 and at least a portion of the stiffener 90. The inner casing 40 is a hollow casing or shell that may be formed as a single casing or as a multi-component casing coupled together. The type of pipe fitting may determine whether the inner casing 40 is a single casing or a multi-component casing. For example, the inner casing 40 may be a multi-component casing where the pipe fitting has two or more pipe ports 24, such as in coupler type pipe fittings, elbow type pipe fittings, Tee type pipe fittings, or reducer type pipe fittings. As another example, where the pipe fitting has one pipe port 24, such as in end cap type pipe fittings, the inner casing 40 may be a single casing. In the embodiment of a coupler shown in FIGS. 1-4, the inner casing 40 is a multi-component casing having two casing members 42 that are coupled within the outer casing 20 to form the inner casing 40. In the exemplary embodiment of an elbow shown in FIGS. 19 and 20, the inner casing 40 is a multi-component casing having two casing members 42 and a main body between the casing members to effect a 90-degree angle of the elbow shown. Thus, in this exemplary embodiment the casing members 42 and the main body form the inner casing 40.

Continuing to refer to FIGS. 2-4, each casing member 42 has an inner end 46 and an outer end 48. The inner end 46 has a circumferential ring 50 extending beyond an outer surface of the casing member 42. The ring 50 is aligned with the opening 26 in the outer casing body 22 so that a pipe 200 passing through a pipe port 24 and an opening 26 can pass into the hollow portion of the casing member 42. On the inside of the circumferential ring 50 is a circumferential notch 52. In the embodiment of FIGS. 1-4, the circumferential notch 52 is used to receive a hub 60 that maintains the gripper 70 and the stiffener 90 within the inner casing 40. In the exemplary embodiment of the coupler 10, the notches 52 of each casing member 42 when joined form a channel 44 to receive an outer wall 62 of the hub 60. The hub 60 may be secured within the channel 44 by, for example, a friction fit, adhesive, weld or mechanical fastener. The hollow portion of the inner casing members 42 extends from the circumferential notch 52 to a circumferential ring 54 at the outer end 48. The hollow portion of the casing members 42 has a straight portion starting at the notch 52 followed by a tapered portion, e.g., a frusto-conical surface, that ends at the circumferential ring 54. The circumferential ring 54 maintains the gripper 70 within the inner casing 40. The outer end 48 includes an opening 56 that can receive the stiffener 90 and a pipe 200.

It is noted that for the coupler 10, two grippers 70 are incorporated into the coupler 10, one in each casing member 42. Each gripper 70 has an opening 72 that is aligned with a pipe port 24, and includes reverse serrations that can flex when a pipe 200 is passed into the gripper 70 imparting little resistance to the forward advancement of the pipe 200 into the inner casing member 42, while imparting sufficient resistance to rearward movement of the pipe to prevent withdrawal of the pipe 200 from the inner casing 40. In instances where a pipe fitting has more than two pipe ports 24, e.g., a Tee type pipe fitting, there would be more than two grippers 70 within the inner casing 40, with each gripper 70 opening aligned with a pipe port 24. In instances where a pipe fitting has one pipe port 24, e.g., an end cap type pipe fitting, there would be one gripper 70 having an opening 30 that is associated with the pipe port 24.

The gripper 70 is a hollow member having an inner end 70a that is configured to abut hub 60 and an outer end 70b. The side of the gripper 70 opposite the hub 60 is tapered, generally a frusto-conical shape that coincides with the shape and slope of a tapered edge within the casing member 42 adjacent the ring 54. Each gripper 70 is preferably constructed of material that is harder than the pipe. Having a tapered end of the gripper 70 that is shaped to coincide with the tapered edge of the casing member 42 allows the gripper 70 to engage the casing member 42 in the event a pipe 200 is pulled in an attempt to withdraw the pipe 200 from the coupler 10. When the gripper 70 tapered end engages the tapered edge of the casing member 42, the gripper 70 is caused to constrict so that the serrations more tightly bite into the pipe 200 to prevent the withdrawal of the pipe from the coupler 10.

Figure 7:
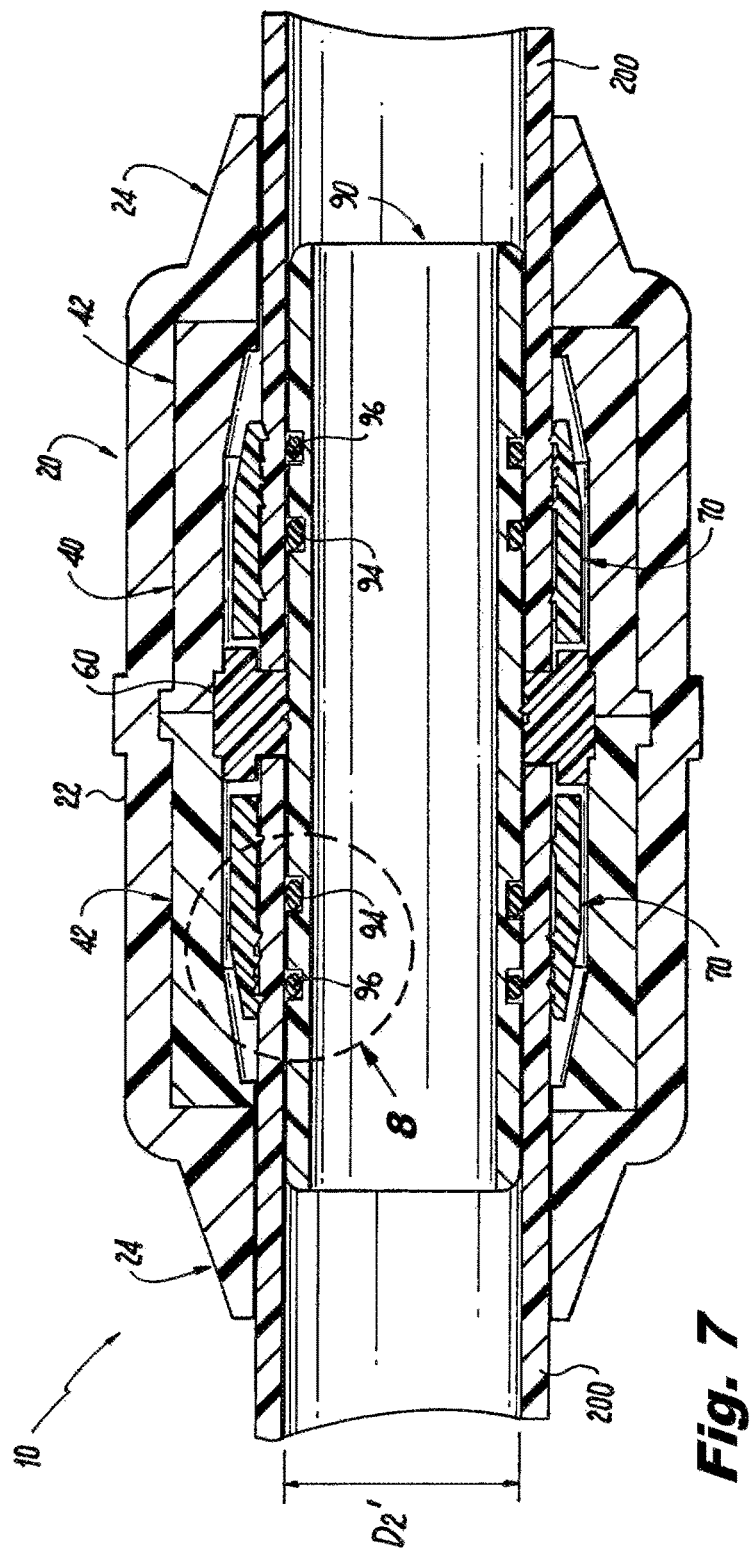
FIG. 7 is a cross-sectional view of the pipe fitting of FIG. 1, illustrating pipes having a minimum internal diameter capable of fitting over the stiffener.
Figure 11:
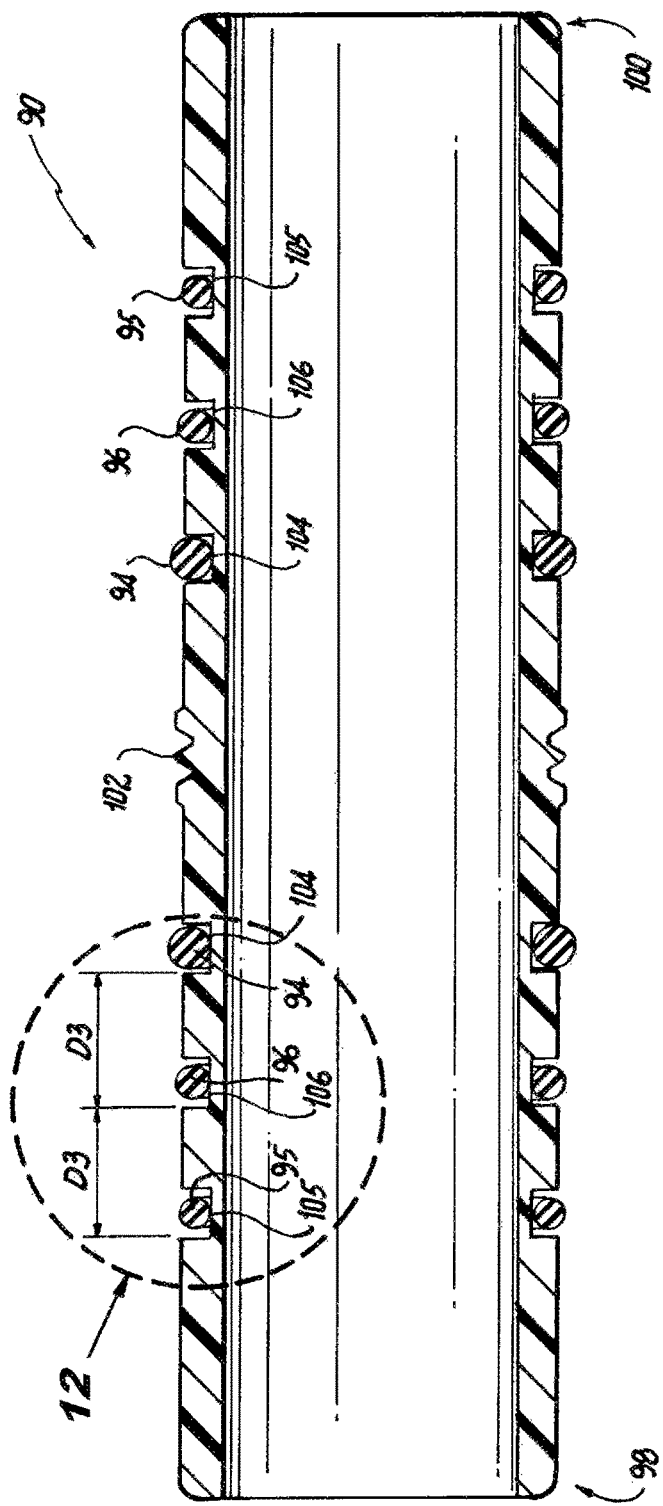
FIG. 11 is a cross-sectional view of another exemplary embodiment of the stiffener of FIG. 4, illustrating three sealing members positioned around the stiffener.
Figure 12:
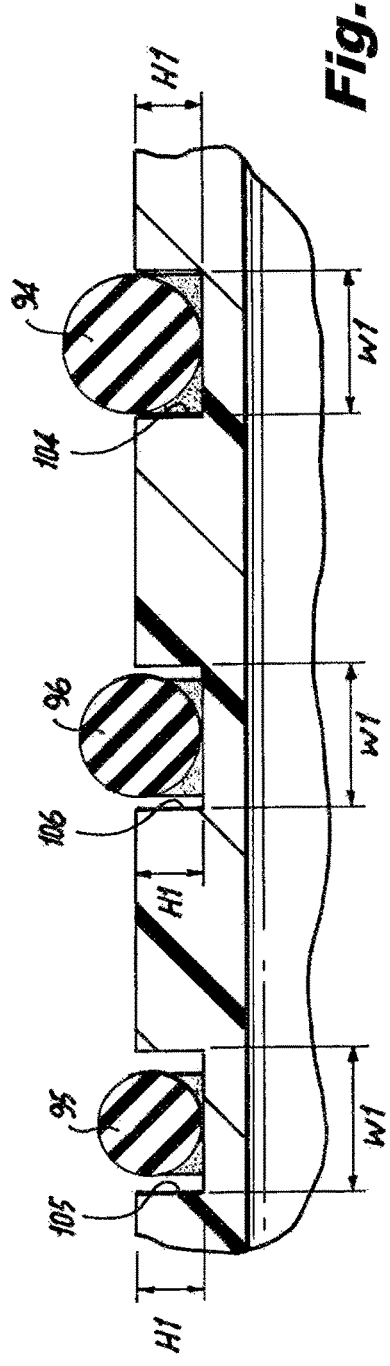
FIG. 12 is an enlarged view of a portion of the stiffener of FIG. 11, illustrating three sealing members having different diameters in circumferential grooves having the same depth.

Referring to FIGS. 5 and 6, the stiffener 90 has two sets of two sealing members 94 and 96 positioned along the stiffener 90. However, it should be understood that each set may have more than two sealing members 94 and 96 positioned along the stiffener 90. For example, FIGS. 11 and 12 show a stiffener 90 having two sets of three sealing members 94, 95 and 96 positioned along the stiffener 90. The stiffener 90 is preferably a tubular structure constructed of rigid material, such as plastic or metal. The stiffener 90 is positioned within the inner casing 40 so that one end 98 is positioned in alignment with the opening 26 in the outer casing 20 and the opening 56 in one inner casing member 42. The other end 100 of the stiffener 90 is positioned in alignment with another opening 26 in the outer casing 20 and opening 56 in the other inner casing member 42. The stiffener 90 has an external diameter that is smaller than the allowable variation in the internal diameter D2' (seen in FIG. 7) and D2" (seen in FIG. 9) of the pipes 200 that may be inserted into the coupler 10 and pushed onto the stiffener 90. As pipes 200 are inserted into a pipe port 24, the corresponding opening 26 in the outer casing 20 and the corresponding opening 56 in the other inner casing member 42, they can be pushed onto the ends 98 or 100 of the stiffener 90. As noted above with reference to FIG. 2, as a pipe 200 is pushed into a pipe port 24, the pipe port 24 straightens the pipe before the pipe is passed over the stiffener 90.

As described above, the stiffener 90 is secured within coupler 10 using the hub 60 that encircles the stiffener 90 approximately midway between ends 98 and 100. To assist in securing the hub 60 to the stiffener 90, a knurled area 102 may be formed on the outer surface of the stiffener 90, as shown in FIG. 5. The knurled area 102 helps maintain the hub 60 in position on the stiffener 90. In another embodiment, the hub 60 may be bonded to the stiffener 90 at the knurled area 102 or instead of including a knurled area.

To seal plastic pipes 200 within the coupler 10 using the stiffener 90 of FIGS. 5 and 6, the stiffener 90 includes two sets of two circumferential grooves 104 and 106 to support the sealing members 94 and 96, which may be, for example, elastomeric O-rings. The sealing members 94 and 96 provide a multi-compression feature where both sealing members contact the internal walls of the plastic pipe 200 connected to the coupler 10 to provide a liquid or gas proof seal. In this exemplary embodiment, each pair of circumferential grooves 104 and 106 and corresponding sealing members 94 and 96 are positioned on the stiffener 90 on opposite sides of the location where the hub 60 would be located relative to the stiffener 90, or in other words on opposite sides of the knurled area 102 if the stiffener 90 has a knurled area 102. The circumferential grooves 104 and 106 are formed in an outer surface of the stiffener 90, as shown in FIGS. 5 and 6. Each pair of circumferential grooves 104 and 106 may also be referred to as an inner circumferential groove 104 and an outer circumferential groove 106. The circumferential grooves 104 and 106 are spaced apart a distance "D3" that may range from about 5 mm to about 50 mm. To seal plastic pipes 200 within the coupler 10 using the stiffener 90 of FIGS. 11 and 12, the stiffener includes two sets of three circumferential grooves 104, 105 and 106 to support the sealing members 94, 95 and 96, which may be, for example, elastomeric O-rings. The sealing members 94, 95 and 96 provide a multi-compression feature where all three sealing members may contact the internal walls of the plastic pipe 200 connected to the coupler 10 to provide a liquid or gas proof seal. In this exemplary embodiment, each pair of circumferential grooves 104, 105 and 106 and corresponding sealing members 94, 95 and 96 are positioned on the stiffener 90 on opposite sides of the location where the hub 60 would be located relative to the stiffener 90, or in other words on opposite sides of the knurled area 102 if the stiffener 90 has a knurled area 102. The circumferential grooves 104, 105 and 106 are formed in an outer surface of the stiffener 90, as shown in FIGS. 11 and 12. Each pair of circumferential grooves may also be referred to as an inner circumferential groove 104, an intermediate circumferential groove 106, and an outer circumferential groove 105. The circumferential grooves 104, 105 and 106 are spaced apart a distance "D3" that may range from about 5 mm to about 50 mm.

The multi-compression feature of the present disclosure permits the pipe fitting, e.g., the coupler 10, to connect to pipes 200 with variations in the internal diameter of the pipe and maintain a sufficient seal to prevent liquid or gas leakage. For example, one vendor could make a 1" polyethylene pipe with an internal diameter of 1.082 inches, and another vendor could make a 1" polyethylene pipe with an internal diameter 1.044 inches. Both pipes 200 would be within the dimensional requirements for such 1" pipes, but that variation in the internal diameters may be sufficient to impact the seal between the pipe and the fitting. As another example, when a 1" polyethylene pipe is manufactured the 1" pipe may have variations in the inner diameter of the pipe due to irregularities in the manufacturing process.

In addition, the multi-compression feature of the present disclosure permits the pipe fitting, e.g., the coupler 10, to maintain the seal between the fitting and the pipe 200 in an expanded temperature range. For example, in one temperature range, e.g., −40 degrees F. to 100 degrees F., a sealing member 94, 95 or 96, such as an elastomeric O-ring, may retain its hardness, elongation and compressive properties, but at a different temperature range, e.g., 100 degrees F. to 200 degrees F., the sealing member's hardness, elongation and compressive properties may change. Using the multi-compression feature of the present disclosure allows the use of different size sealing members 94, 95 or 96 or positions the sealing members differently to meet potential variations in the sealing members that may be caused by temperature fluctuations.

Figure 8:
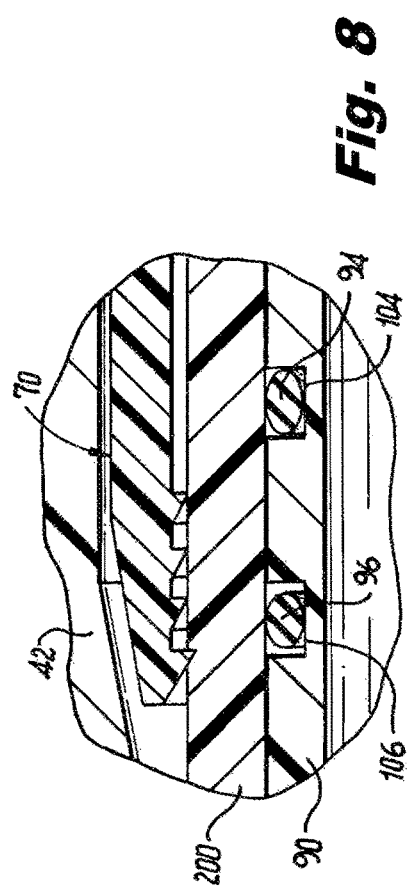
FIG. 8 is an enlarged view of a portion of the pipe fitting of FIG. 7, illustrating the two sealing members engaging an inner wall of the pipe having the minimum internal diameter.
Figure 9:
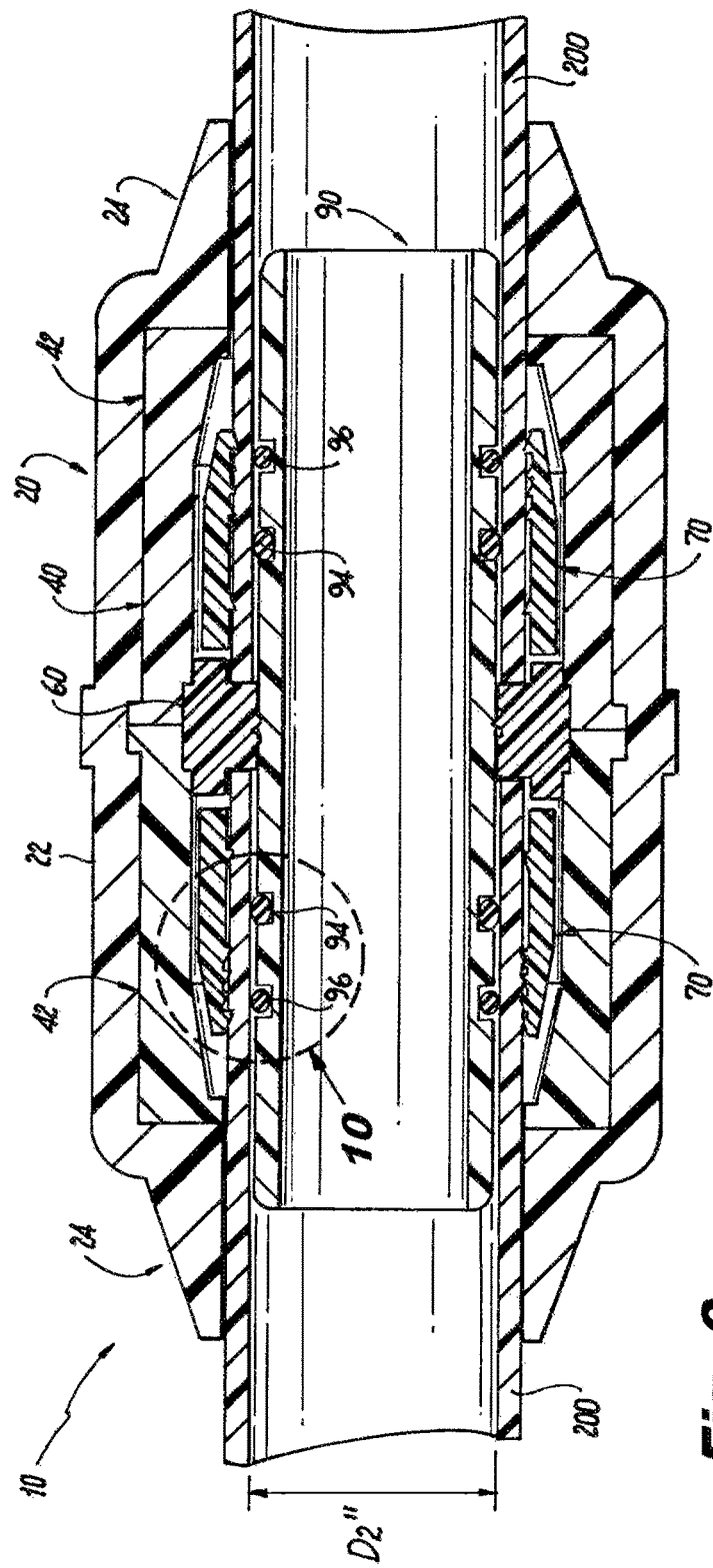
FIG. 9 is a cross-sectional view of the pipe fitting of FIG. 1, illustrating pipes having a maximum internal diameter capable of fitting over the stiffener.
Figure 10:
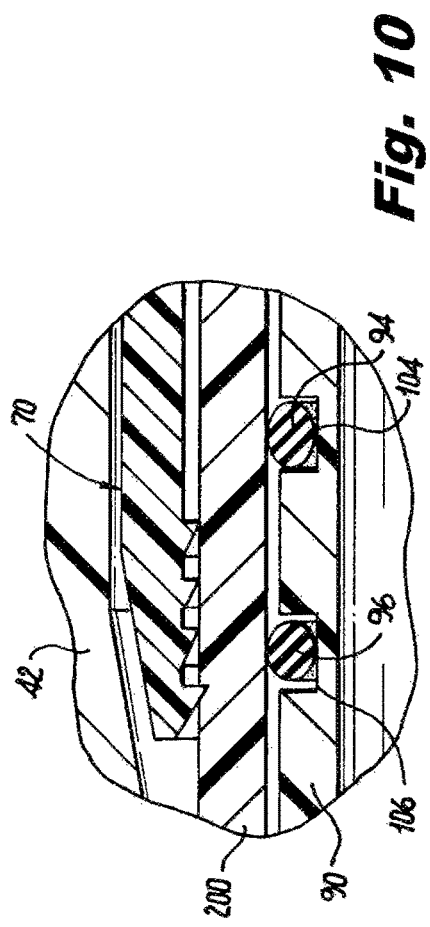
FIG. 10 is an enlarged view of a portion of the pipe fitting of FIG. 9, illustrating the two sealing members engaging an inner wall of the pipes having the maximum internal diameter.

To be able to seal pipes 200 with variations in their internal diameter and/or in expanded temperature range scenarios, the stiffener 90 shown in FIGS. 5 and 6, for example, may have circumferential grooves 104 and 106 that are the same size while the sealing members 94, 95 or 96, e.g., elastomeric O-rings, are different in sizes. To illustrate, circumferential grooves 104 and 106 have a width W1 that may range from about 1 mm to about 20 mm, and a height H1 that may range from about 1 mm to about 20 mm. The sealing members 94 and 96 are different in that the outer sealing member 96 is smaller than the inner sealing member 94 to facilitate easier insertion of a pipe 200 onto the stiffener 90. In this embodiment and referring to FIGS. 7 and 8, a pipe 200 having a minimum internal diameter variation D2' that may fit over the stiffener 90 causes the sealing members 94 and 96 to compress to a maximum compression to seal the pipe 200 relative to the stiffener 90. In this example, the sealing member 94 compresses more than sealing member 96, as shown. Similarly, and referring to FIGS. 9 and 10, a pipe 200 having a maximum internal diameter variation D2" that may fit over the stiffener 90 causes the sealing members 94 and 96 to compress to a minimum compression to seal the pipe 200 relative to the stiffener 90. In this example, the sealing member 94 compresses slightly more than sealing member 96, as seen in FIGS. 9 and 10.

To be able to seal pipes 200 with variations in their internal diameter and/or in expanded temperature range scenarios, the stiffener 90 shown in FIGS. 11 and 12, for example, may have circumferential grooves 104, 105 and 106 that are the same size while the sealing members 94, 95 or 96, e.g., elastomeric O-rings, are different in sizes. To illustrate, circumferential grooves 104, 105 and 106 have a width W1 that may range from about 1 mm to about 20 mm, and a height H1 that may range from about 1 mm to about 20 mm. The sealing members 94, 95 and 96 are different in that the outer sealing member 95 is smaller than the intermediate sealing member 96, which is smaller than the inner sealing member 94 to facilitate easier insertion of a pipe 200 onto the stiffener 90. In this embodiment and referring to FIG. 13, a pipe 200 having a minimum internal diameter variation D2' that may fit over the stiffener 90 causes the sealing members 94, 95 and 96 to compress to a maximum compression to seal the pipe 200 relative to the stiffener 90. In this example, the sealing member 96 compresses more than sealing member 95, and the sealing member 94 compresses more than sealing member 96, as shown. Similarly, and referring to FIG. 14, a pipe 200 having a maximum internal diameter variation D2" that may fit over the stiffener 90 causes the sealing members 94 and 96 to compress to a minimum compression while sealing member 95 does not engage the pipe 200 so that sealing members 94 and 96 seal the pipe 200 relative to the stiffener 90. In this example, the sealing member 94 compresses slightly more than sealing member 96, as seen in FIG. 14.

Figure 17:
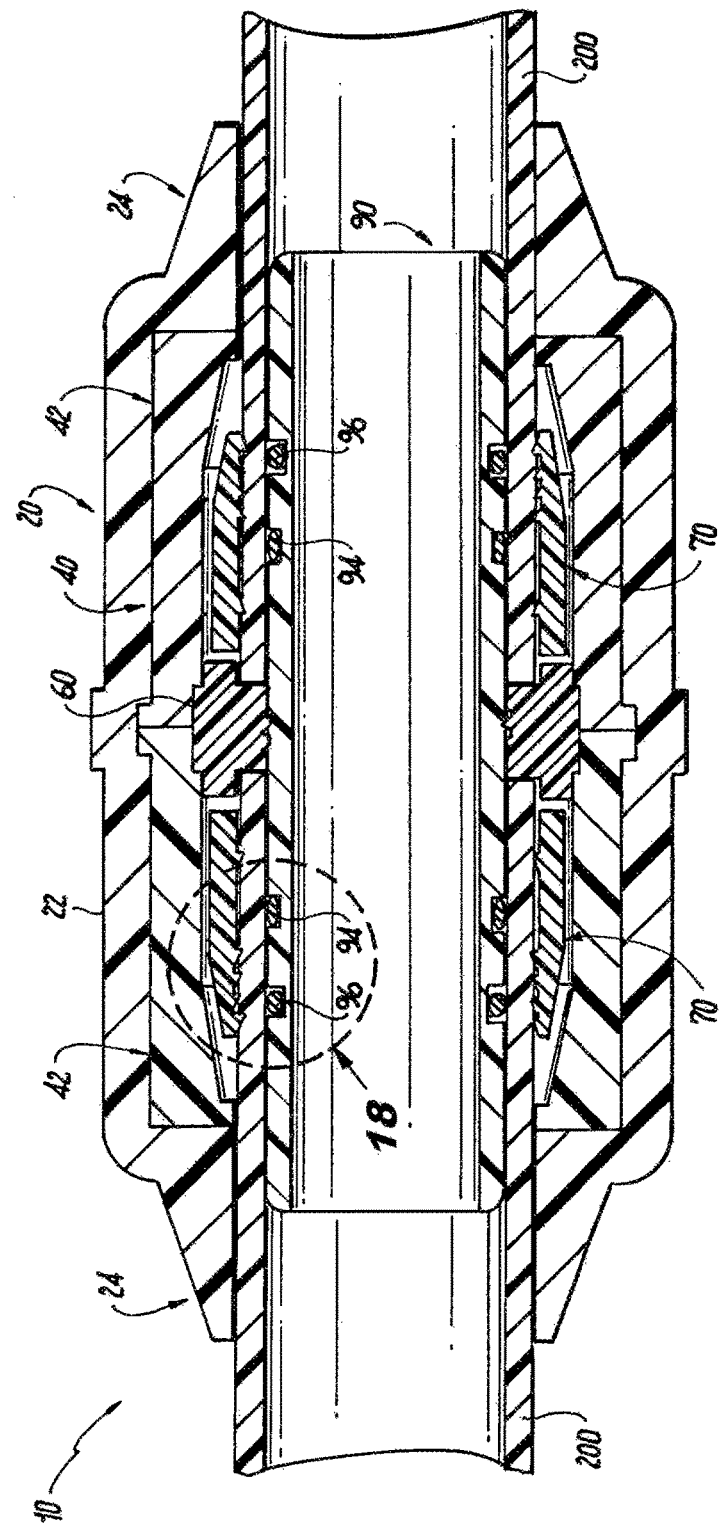
FIG. 17 is a cross-sectional view of the pipe fitting of FIG. 1 and the stiffener of FIG. 15, illustrating pipes having a minimum internal diameter capable of fitting over the stiffener.
Figure 18:
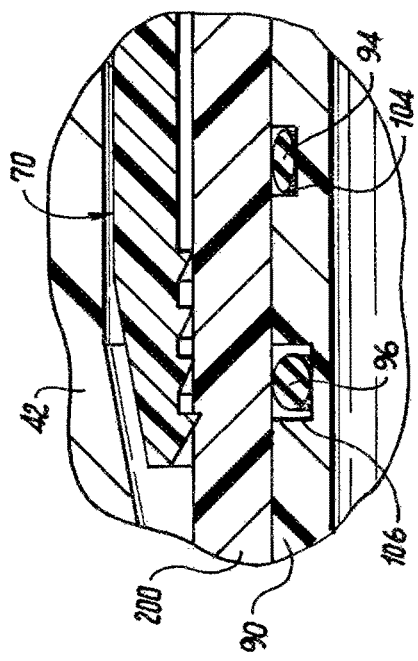
FIG. 18 is an enlarged view of a portion of the pipe fitting of FIG. 17, illustrating the two sealing members engaging an inner wall of the pipes having the minimum internal diameter.

Referring now to FIGS. 4, 15 and 16, another exemplary embodiment of a stiffener 90 for sealing pipes 200 with variations in their internal diameter and/or in expanded temperature range scenarios is shown. In this embodiment, the stiffener 90 has two sets of two circumferential grooves 104 and 106 that differ in size but receive sealing members 94 or 96 having the same size, e.g., the same diameter. To illustrate, circumferential grooves 104 and 106 have a width W2 that may range, for example, from about 1 mm to about 10 mm, but circumferential groove 104 has a height H2 that may range from about 0.6 mm to about 10 mm, while circumferential groove 106 has a height H3 that may range from about 0.9 mm to about 11 mm. The two sets of sealing members 94 and 96, e.g., elastomeric O-rings, are the same diameter size, e.g., the same diameter. As a result, and referring to FIGS. 17 and 18, a pipe 200 having a minimum internal diameter variation D2' that may fit over the stiffener 90 causes the sealing members 94 and 96 to compress to a maximum compression to seal the pipe 200 relative to the stiffener 90. In this example, the sealing member 94 compresses more than sealing member 96. Similarly, and referring to FIGS. 19 and 20, a pipe 200 having a maximum internal diameter variation D2" that may fit over the stiffener 90 causes the sealing members 94 and 96 to compress to a minimum compression for this embodiment to seal the pipe 200 to the stiffener 90. In this example, the sealing member 94 compresses more than sealing member 96.

Figure 23:
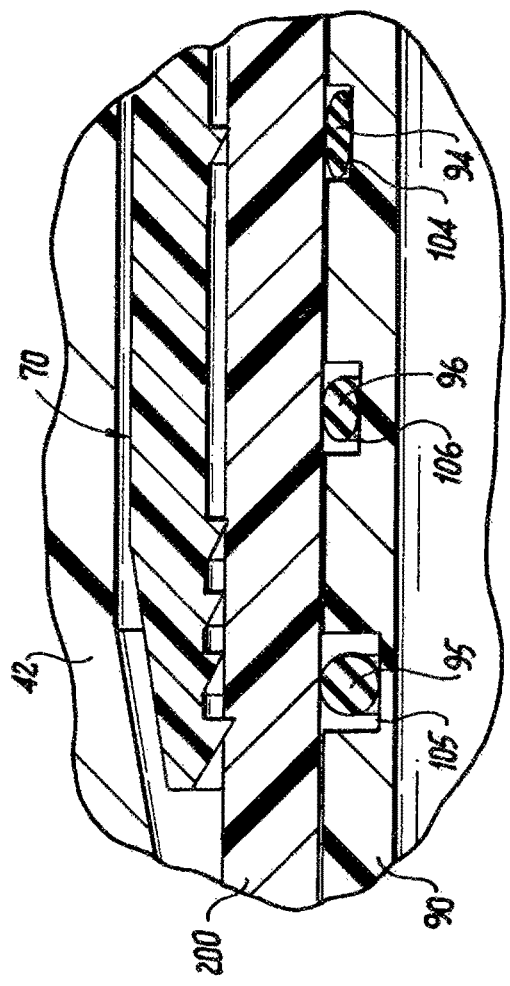
FIG. 23 is an enlarged view of a portion of the pipe fitting of FIG. 7 having a stiffener of FIG. 21, illustrating the three sealing members engaging an inner wall of the pipe having the minimum internal diameter.
Figure 24:
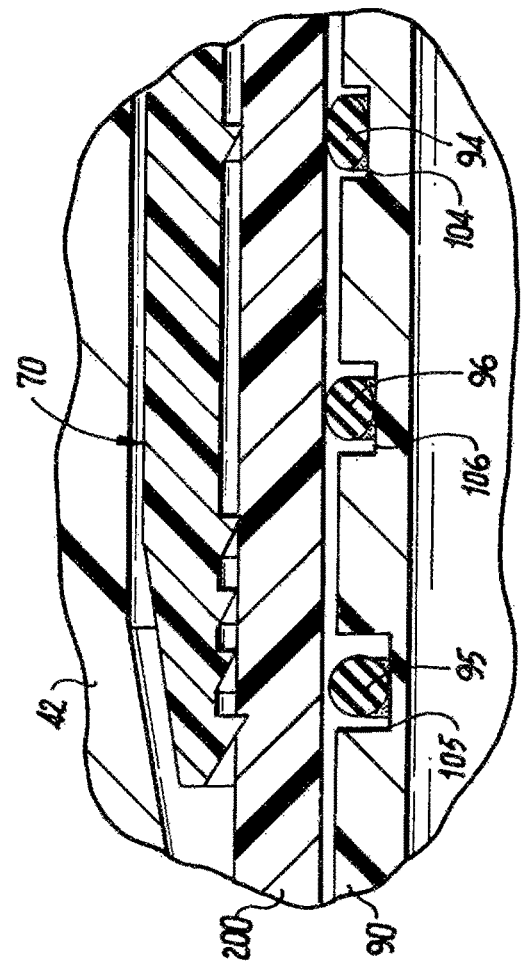
FIG. 24 is an enlarged view of a portion of the pipe fitting of FIG. 9 having a stiffener of FIG. 21, illustrating the three sealing members engaging an inner wall of the pipes having the maximum internal diameter.

Referring now to FIGS. 21 and 22, another exemplary embodiment of a stiffener 90 for sealing pipes 200 with variations in their internal diameter and/or in expanded temperature range scenarios is shown. In this embodiment, the stiffener 90 has two sets of three circumferential grooves 104, 105 and 106 that differ in size but receive sealing members having the same size, e.g., the same diameter. To illustrate, circumferential grooves 104, 105 and 106 have a width W2 that may range from about 1 mm to about 10 mm, but circumferential groove 104 has a height H2 that may range from about 0.6 mm to about 10 mm, while circumferential groove 106 has a height H3 that may range from about 0.9 mm to about 11 mm, while circumferential groove 105 has a height H4 that may range from about 1.2 mm to about 12 mm. The two sets of sealing members 94, 95 and 96, e.g., elastomeric O-rings, are the same diameter size, e.g., the same diameter. As a result, and referring to FIG. 23, a pipe 200 having a minimum internal diameter variation D2' that may fit over the stiffener 90 causes the sealing members 94, 95 and 96 to compress to a maximum compression to seal the pipe 200 relative to the stiffener 90. In this example, the sealing member 94 compresses more than sealing member 96, and the sealing member 96 compresses more than sealing member 95. Similarly, and referring to FIG. 24, a pipe 200 having a maximum internal diameter variation D2" that may fit over the stiffener 90 causes the sealing members 94 and 96 to compress to a minimum compression while sealing member 95 does not engage the pipe 200 so that sealing members 94 and 96 seal the pipe 200 relative to the stiffener 90. In this example, the sealing member 94 compresses more than sealing member 96.

While the stiffener and sealing members that provide the multi-compression feature of the present disclosure are shown as having two or three sealing members on each side of the stiffener, the present disclosure contemplates using more than three sealing members on each side of the stiffener.

Figure 25:
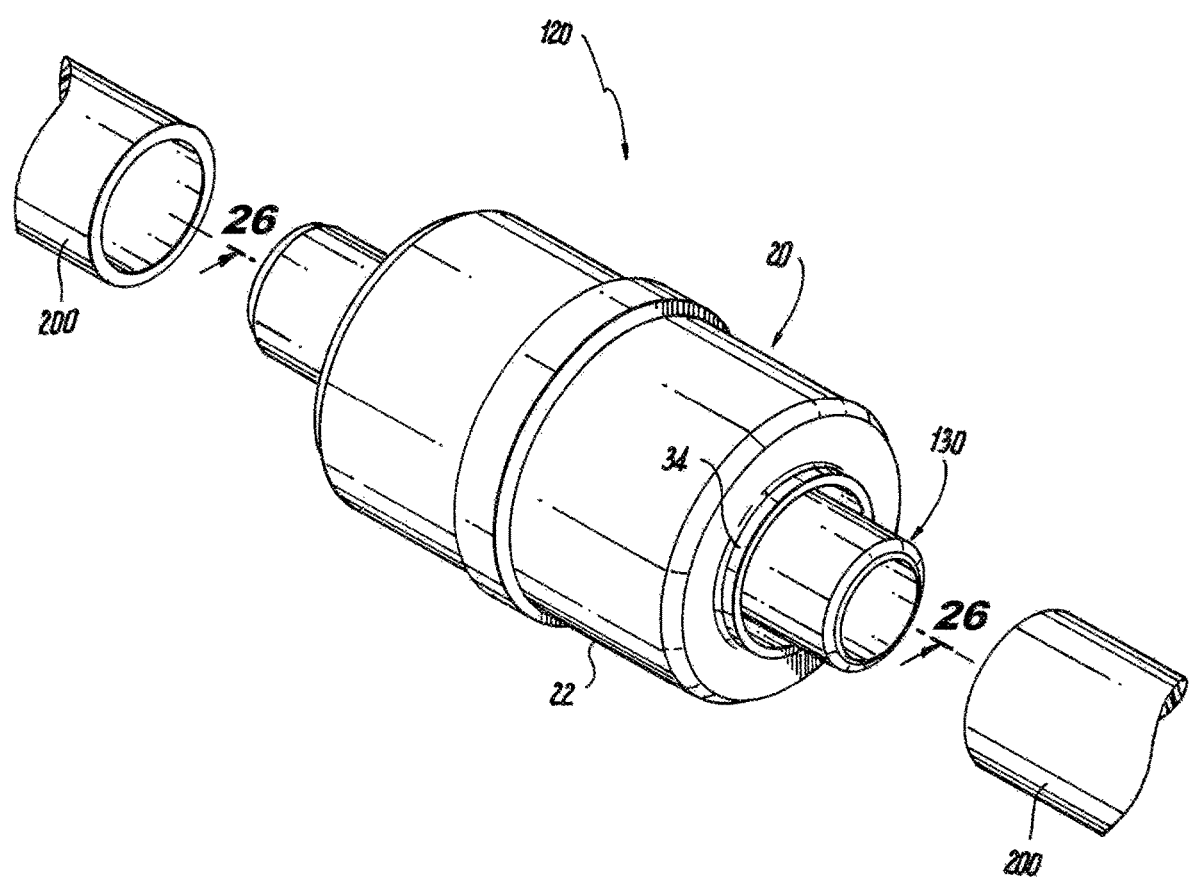
FIG. 25 is a perspective view of another exemplary embodiment of a pipe fitting according to the present disclosure.
Figure 26:
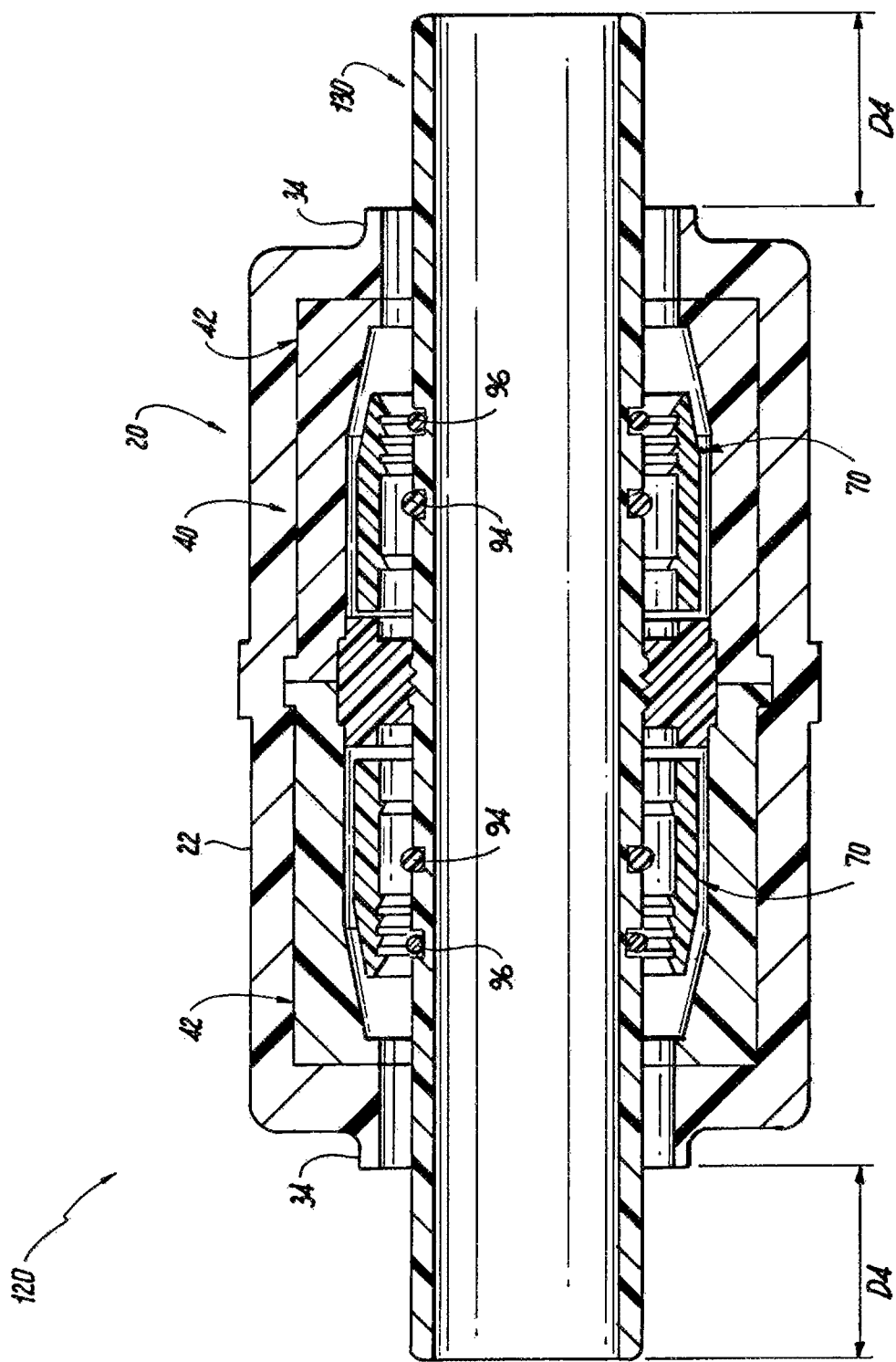
FIG. 26 is a cross-sectional view of the pipe fitting of FIG. 25 taken along line 26-26.

Turning to FIGS. 25 and 26, another exemplary embodiment of a pipe fitting according to the present disclosure is shown. In the exemplary embodiment shown, the pipe fitting is a coupler 120 that is used to join two plastic pipes 200 together. Thus, for this part of the description, the pipe fitting will be referred to as the coupler 120. The coupler 120 includes an outer casing or shell 20, an inner casing or shell 40, a gripper 70, and a stiffener 130. In this exemplary embodiment, the outer casing 20 is substantially similar to the outer casing 20 described above, except that the pipe port lips 34 are not an elongated body. In this exemplary embodiment, the pipe ports lips 34 are more like snub-nose bodies similar to those in conventional stab-type pipe fittings. In addition, the inner casing 40 and gripper 70 are the same as the inner casing and gripper described above and for ease of description are not repeated. In this embodiment, the stiffener 130 is an elongated stiffener that extends outside the outer casing 20 a distance D4 which may be at least about 1 inch. The elongated stiffener 130 ensures that a pipe 200 connected to the coupler 120 is straight at the point where the sealing members 94 and 96 engage the inner wall of the pipe 200. To seal the pipe 200 to the stiffener 130, the embodiments of the circumferential grooves 104 and 106 and the sealing members 94 and 96 described above may be used and are not repeated. However, as noted above, while the stiffener 130 and sealing members 94 and 96 that provide the multi-compression feature of the present disclosure are shown in FIGS. 25 and 26 as having two sealing members 94 and 96 on each side of the stiffener 130, the present disclosure contemplates using more than two sealing members on each side of the stiffener 130, such as three sealing members on each side of the stiffener 130.

Figure 27:
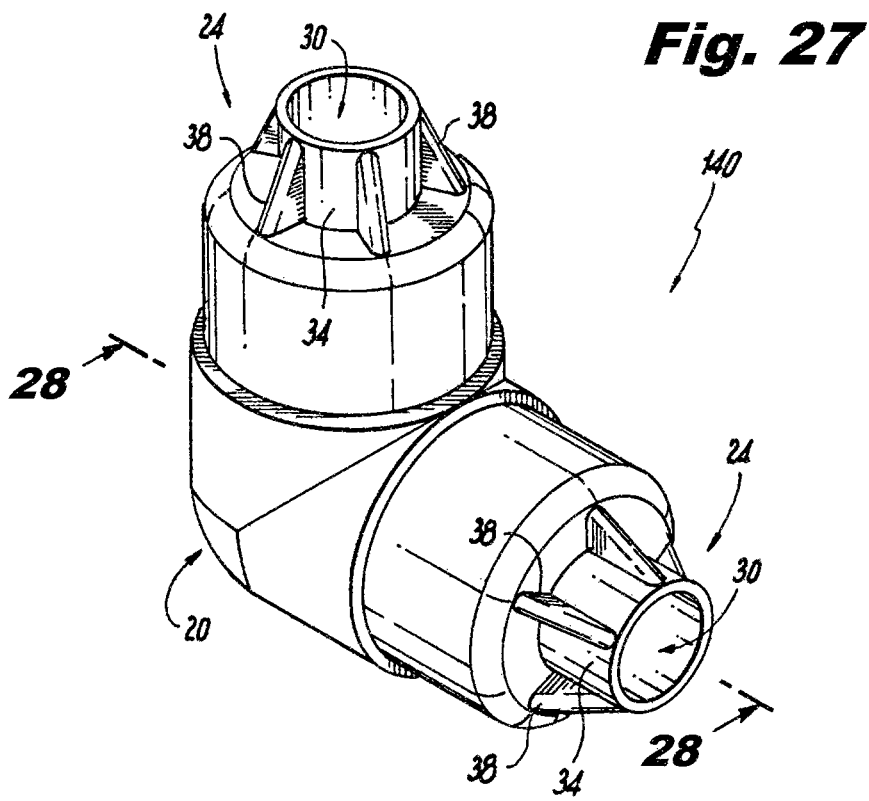
FIG. 27 is a front perspective view of another exemplary pipe fitting according to the present disclosure.
Figure 28:
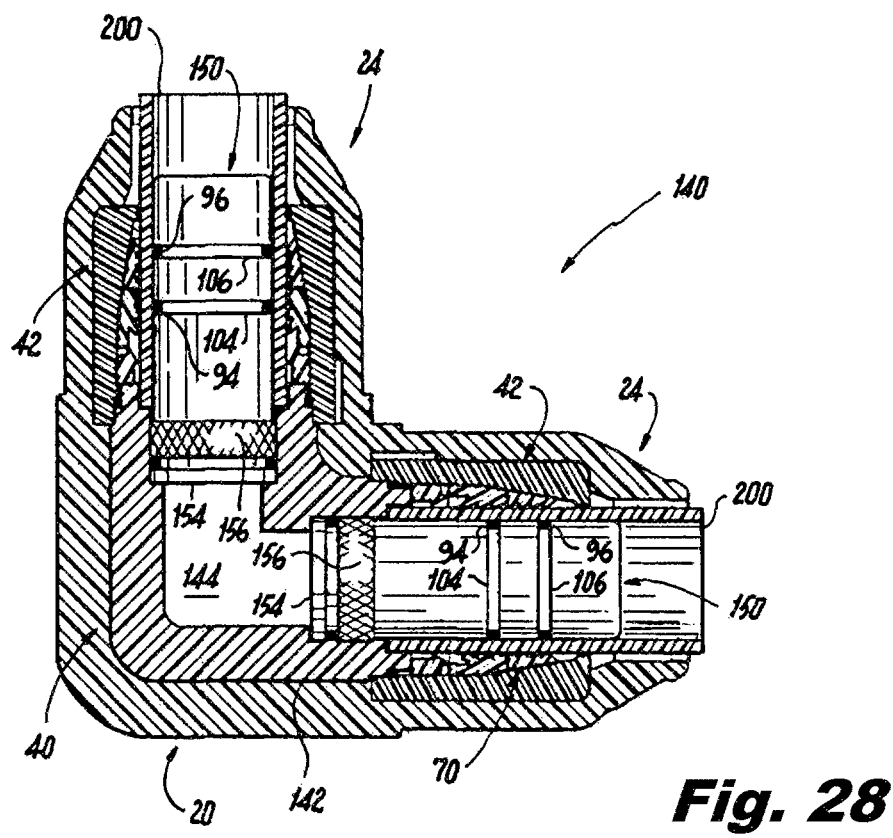
FIG. 28 is a cross-sectional view of the pipe fitting of FIG. 27 taken along line 28-28.

Referring now to FIGS. 27 and 28, another exemplary embodiment of a pipe fitting according to the present disclosure is shown. In this exemplary embodiment, the pipe fitting is an elbow 140 used to join two plastic pipes together at an angle. Examples of elbows include 90 degree elbows, 45 degree elbows and 22 degree elbows. Thus, for this part of the description, the pipe fitting will be referred to as the elbow 140 where like numbered components have like functions as described above with reference to FIGS. 1-26. The outer casing 20 in this exemplary embodiment is shaped as an elbow with the desired angle, here 90 degrees. The elbow 140 in this embodiment has two pipe ports 24. To accommodate the bend of the elbow, the casing members 42 of the inner casing 40 are separated and a main body 142 having fluid or gas passageway 144 is inserted between the casing members 42 which together form the inner casing 40. Retained within each casing member 42 is a gripper 70 having the components and functions as described above.

In this exemplary embodiment, two stiffeners 150 are provided, where one stiffener 150 is associated with one casing member 42 and the other stiffener 150 is associated with the other casing member 42. As noted, to connect one stiffener 150 to the other stiffener 150 the inner casing 40 includes the main body 142 having a fluid or gas passageway 144 that provides a conduit in the shape of the angle of the elbow 140, e.g., 90 degrees, to permit fluid or gas to pass from one stiffener 150 to the other stiffener 150, and thus from one pipe 200 to another pipe 200. Each stiffener 150 is substantially similar to a portion of the stiffener 90 described above. More specifically, each stiffener 150 is a tubular member made of a rigid material, and includes at least two sealing members, e.g., sealing members 94 and 96, supported within at least two corresponding circumferential grooves, e.g., grooves 104 and 106, as described above. However, as noted above, while the stiffener 150 and sealing members 94 and 96 that provide the multi-compression feature of the present disclosure are shown in FIGS. 27 and 28 as having two sealing members 94 and 96 on each side of the stiffener 150, the present disclosure contemplates using more than two sealing members on each side of the stiffener 150, such as three sealing members on each side of the stiffener 150. To secure the stiffener 150 within the inner casing 40, an end 154 of the stiffener 150 may include a knurled area 156 that secures the stiffener 150 within a hollow portion of the main body 142 by, for example, a friction fit as shown in FIG. 21. In another embodiment, the stiffener 150 may be secured within the hollow portion of the main body 142 using an adhesive.

Figure 29:
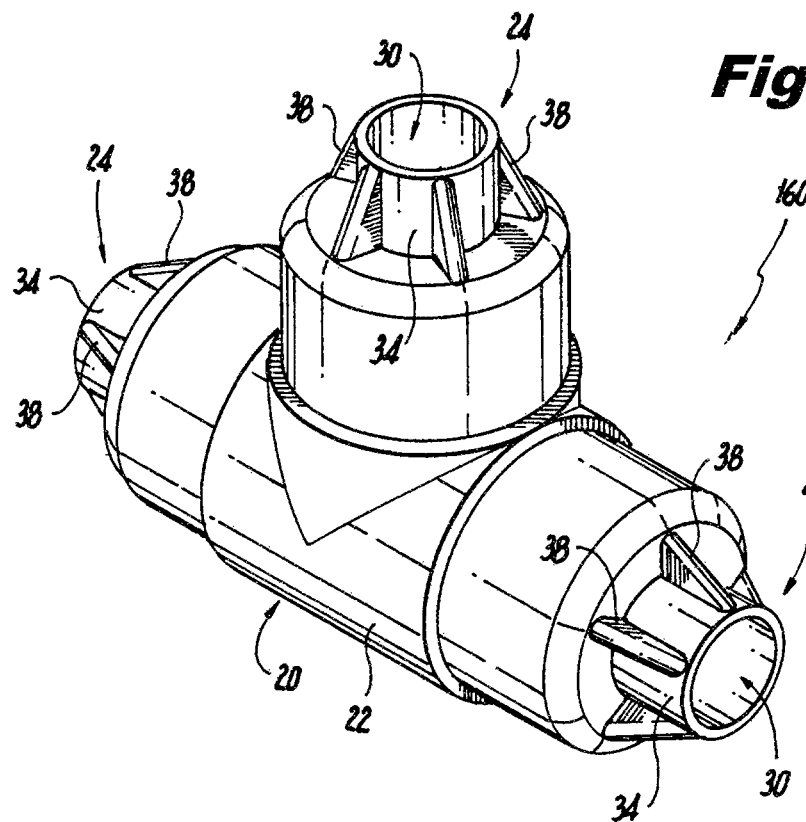
FIG. 29 is a front perspective view of another exemplary pipe fitting according to the present disclosure.
Figure 30:
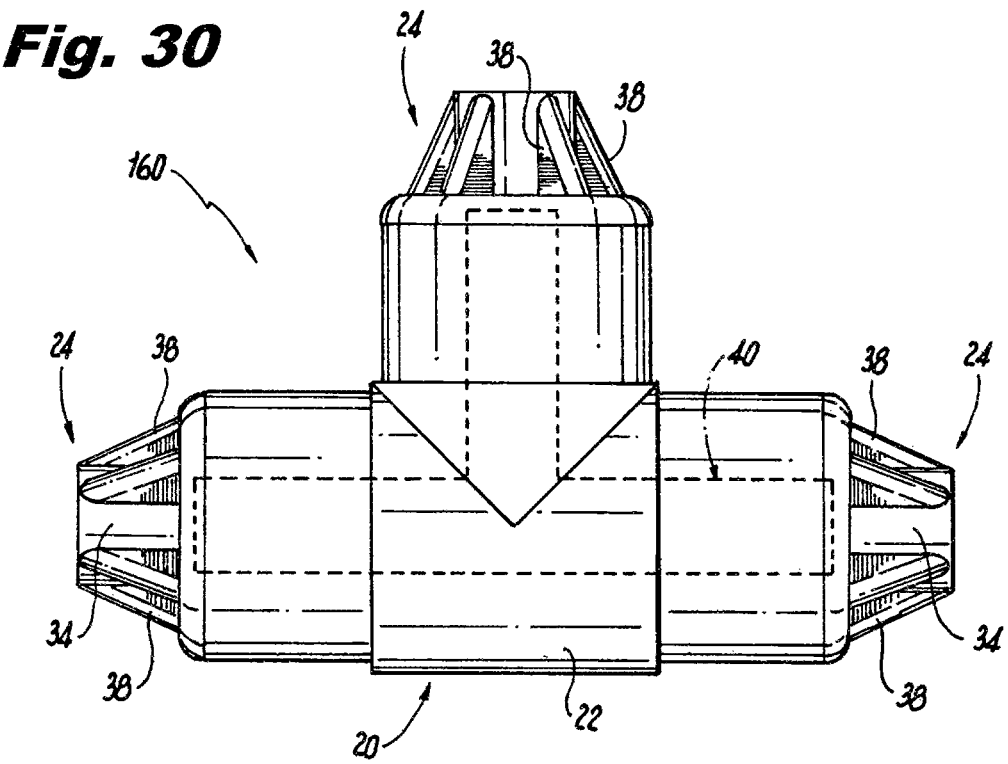
FIG. 30 is a side view of the pipe fitting of FIG. 29.

Referring now to FIGS. 29 and 30, another exemplary embodiment of a pipe fitting according to the present disclosure is shown. In this exemplary embodiment, the pipe fitting is a Tee used to join three plastic pipes together. Thus, for this part of the description, the pipe fitting will be referred to as the Tee 160 where like numbered components have like functions as described above with reference to FIGS. 1-20. The outer casing 20 in this exemplary embodiment is in the shape of a "T". In this embodiment, there are three casing members 42 to accommodate the bends of the Tee. The casing members 42 are separated by a main body 142 having fluid or gas passageway inserted between the casing members 42 similar to the embodiment described with reference to the elbow 140 of FIGS. 25 and 26, but adopted for a Tee. Together the casing members 42 and main body 142 form the inner casing 40. Retained within each casing member 42 is a gripper having the function as the gripper 70 described above.

In this exemplary embodiment, three stiffeners 150 similar to the stiffeners 150 described above are provided, where one stiffener 150 is associated with one casing member 42. As noted, to connect one stiffener 150 to the other stiffeners the inner casing 40 includes the main body 142 that provides a conduit in the shape of a Tee to permit fluid or gas to pass from one stiffener 150 to the other stiffeners 150. As noted, each stiffener is substantially similar to the stiffener 150 described above with reference to FIG. 26. More specifically, each stiffener 150 is a tubular member made of a rigid material, and includes at least two sealing members, e.g. sealing members 94 and 96, supported within at least two corresponding circumferential grooves, e.g., grooves 104 and 106, as described above. However, as noted above, while the stiffener 150 and sealing members 94 and 96 that provide the multi-compression feature of the present disclosure are shown in FIGS. 29 and 30 as having two sealing members on each side of the stiffener 150, the present disclosure contemplates using more than two sealing members on each side of the stiffener 150, such as three sealing members on each side of the stiffener. To secure the stiffener 150 within the inner casing 40, an end 154 of the stiffener 150 may include a knurled area 156 that secures the stiffener 150 within a hollow portion of the main body by a friction fit. In another embodiment, the stiffener 150 may be secured within the hollow portion of the main body using an adhesive.

Figure 31:
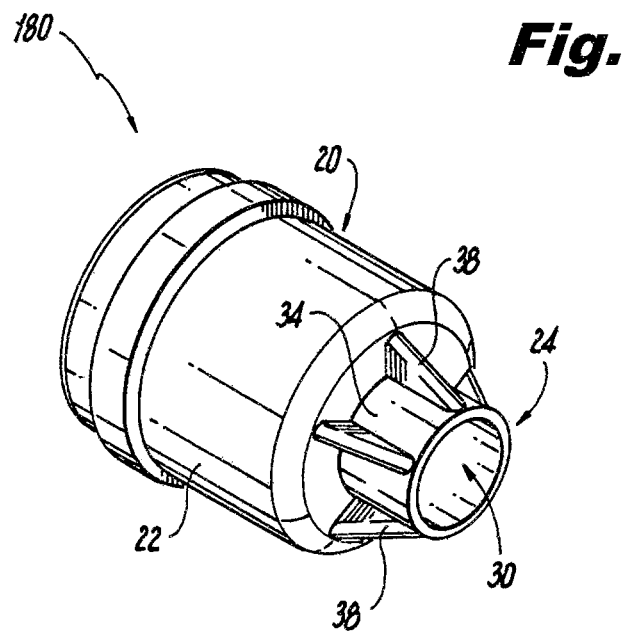
FIG. 31 is a front perspective view of another exemplary pipe fitting according to the present disclosure.
Figure 32:
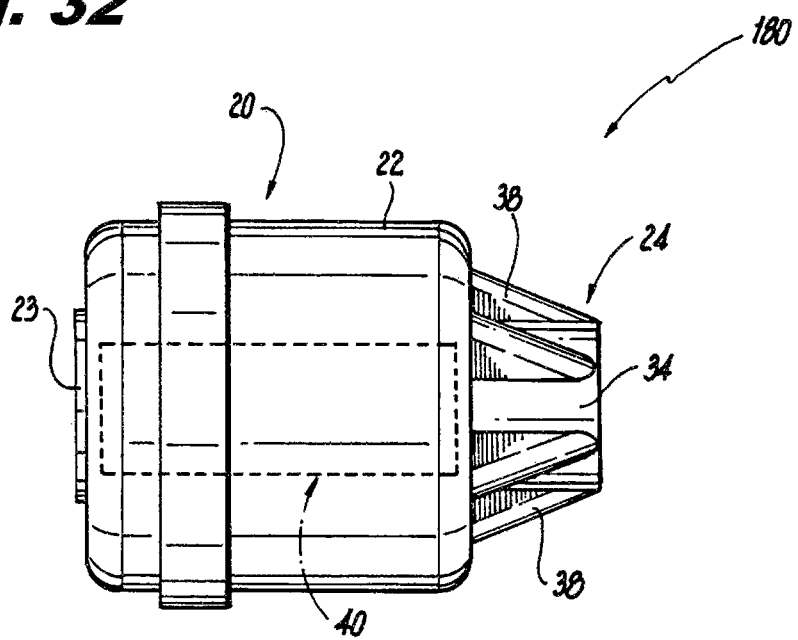
FIG. 32 is a side view of the pipe fitting of FIG. 31.

Referring now to FIGS. 31 and 32, another exemplary embodiment of a pipe fitting according to the present disclosure is shown. In this exemplary embodiment, the pipe fitting is an end cap 180 used to terminate a plastic pipe. Thus, for this part of the description, the pipe fitting will be referred to as the end cap 180 where like numbered components have like functions as described above with reference to FIGS. 1-30. The outer casing 20 in this exemplary embodiment has a closed side 23 and a side with a pipe port 24. In this exemplary embodiment, there is one casing member forming the inner casing 40 within the outer casing 20. Encased within the inner casing 40 is a gripper similar to gripper 70 described above and shown in FIG. 4, and a stiffener 150 similar to stiffener 150 described above and shown in FIG. 26. More specifically, the stiffener is a tubular member made of a rigid material, and includes at least two sealing members, e.g., sealing members 94 and 96, supported within at least two corresponding circumferential grooves, e.g., grooves 104 and 106, as described above. However, as noted above, while the stiffener 150 and sealing members 94 and 96 that provide the multi-compression feature of the present disclosure are shown in FIGS. 31 and 32 as having two sealing members on each side of the stiffener, the present disclosure contemplates using more than two sealing members on each side of the stiffener, such as three sealing members on each side of the stiffener. To secure the stiffener 150 within the inner casing 40, an end 154 of the stiffener 150 may include a knurled area 156 that secures the stiffener 150 within a hollow portion of the casing member 42 by a friction fit. In another embodiment, the stiffener 150 may be secured within the hollow portion of the casing member 42 using an adhesive.

It is noted that a more detailed description of the inner casing and gripper, as well as portions of the outer casing and stiffener described herein are described in commonly owned U.S. Pat. No. 5,692,785 which is incorporated herein in its entirety by reference.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A pipe fitting comprising:
an outer casing having at least one pipe port providing a passageway for a pipe to be passed into the outer casing, wherein the at least one pipe port comprises an elongated lip and a port opening forming at least part of the passageway, the elongated lip being sufficient in length to align and straighten a pipe as it enters the passageway;
a hollow inner casing positioned within the outer casing and having at least one opening aligned with the at least one pipe port;
at least one gripper positioned within the inner casing and having an opening aligned with the at least one pipe port, the at least one gripper includes one or more reverse serrations that can flex when a pipe is passed through the at least one gripper opening permitting forward advancement of the pipe into the at least one gripper while imparting sufficient resistance to rearward movement of the pipe to prevent withdrawal of the pipe from the at least one gripper; and
a stiffener positioned at least partially within the inner casing and the at least one gripper opening and aligned with the at least one port opening, such that a pipe inserted into the at least one pipe port can pass through the inner casing and over the stiffener and through the at least one gripper, wherein the stiffener has at least a pair of sealing members each positioned within a groove in an outer surface of the stiffener such that when a pipe is passed over the stiffener and sealing members the sealing members can contact an interior wall of the pipe to provide a seal between the pipe and the stiffener, and wherein the pair of sealing members have different outer diameters and the grooves have the same dimensions.

2. The pipe fitting according to claim 1, wherein the pipe port further comprises at least one gusset positioned on the elongated lip around the port opening.

3. The pipe fitting according to claim 1, wherein the at least a pair of sealing members comprise elastomeric O-rings.

4. A coupler comprising:
an outer casing having first and second pipe ports each providing a passageway for a pipe to be passed into the outer casing, wherein each pipe port comprises an elongated lip and a port opening forming at least part of the passageway, the elongated lip being sufficient in length to align and straighten a pipe as it enters the passageway;
a hollow inner casing positioned within the outer casing and having a first opening and a second opening, wherein a first inner casing opening is aligned with the first port opening and the second inner casing opening is aligned with the second port opening;
first and second grippers positioned within the inner casing, wherein the first gripper has an opening aligned with the first pipe port opening and wherein the first gripper includes one or more reverse serrations that can flex when a pipe is passed through the first gripper opening permitting forward advancement of the pipe into the first gripper while imparting sufficient resistance to rearward movement of the pipe to prevent withdrawal of the pipe from the first gripper, and wherein the second gripper has an opening aligned with the second pipe port opening and wherein the second gripper includes one or more reverse serrations that can flex when a pipe is passed through the second gripper opening permitting forward advancement of the pipe into the second gripper while imparting sufficient resistance to rearward movement of the pipe to prevent withdrawal of the pipe from the second gripper; and a stiffener positioned within the inner casing and the first and second gripper openings and aligned with the first and second pipe port openings, such that a pipe inserted into the first pipe port can pass through the inner casing over one end of the stiffener and through the first gripper, and a pipe inserted into the second pipe port can pass through the inner casing over another end of the stiffener and through the second gripper, wherein the stiffener has a first pair of sealing members and a second pair of sealing members, wherein each sealing member in the first pair of sealing members is positioned within a groove in an outer surface of the stiffener such that when a pipe is passed over the stiffener and sealing members the sealing members can contact an interior wall of the pipe to provide a seal between the pipe and the stiffener, wherein each sealing member in the second pair of sealing members is positioned within a groove in an outer surface of the stiffener such that when a pipe is passed over the stiffener and sealing members the sealing members can contact an interior wall of the pipe to provide a seal between the pipe and the stiffener, and wherein the pair of sealing members have different outside diameters and the grooves have the same dimensions.

5. The coupler according to claim 4, wherein each of the first and second pipe ports further comprises at least one gusset positioned on the elongated lip around the port opening.

6. The coupler according to claim 4, wherein each pair of sealing members comprise elastomeric O-rings.

7. A pipe fitting comprising:

an outer casing having at least one pipe port providing a passageway for a pipe to be passed into the outer casing, wherein the at least one pipe port comprises an elongated lip and a port opening forming at least part of the passageway, the elongated lip being sufficient in length to align and straighten a pipe as it enters the passageway;

a hollow inner casing positioned within the outer casing and having at least one opening aligned with the at least one pipe port;

at least one gripper positioned within the inner casing and having an opening aligned with the at least one pipe port, the at least one gripper includes one or more reverse serrations that can flex when a pipe is passed through the at least one gripper opening permitting forward advancement of the pipe into the at least one gripper while imparting sufficient resistance to rearward movement of the pipe to prevent withdrawal of the pipe from the at least one gripper; and a stiffener positioned at least partially within the inner casing and the at least one gripper opening and aligned with the at least one port opening, such that a pipe inserted into the at least one pipe port can pass through the inner casing over the stiffener and through the at least one gripper, wherein the stiffener has at least a pair of sealing members each positioned within a groove in an outer surface of the stiffener that is within the at least one gripper opening such that when a pipe is passed over the stiffener and sealing members at least one of the pair of sealing members can contact an interior wall of the pipe to provide a seal between the pipe and the stiffener, and wherein the pair of sealing members have different outside diameters and the grooves have the same dimensions.

8. The pipe fitting according to claim 7, wherein the pipe port further comprises at least one gusset positioned on the elongated lip around the port opening.

9. The pipe fitting according to claim 7, wherein the at least a pair of sealing members comprise elastomeric O-rings.

10. A coupler comprising:

an outer casing having first and second pipe ports each providing a passageway for a pipe to be passed into the outer casing, wherein each pipe port comprises an elongated lip and a port opening forming at least part of the passageway, the elongated lip being sufficient in length to align and straighten a pipe as it enters the passageway;

a hollow inner casing positioned within the outer casing and having a first opening and a second opening, wherein a first inner casing opening is aligned with the first port opening and the second inner casing opening is aligned with the second port opening;

first and second grippers positioned within the inner casing, wherein the first gripper has an opening aligned with the first pipe port opening and wherein the first gripper includes one or more reverse serrations that can flex when a pipe is passed through the first gripper opening permitting forward advancement of the pipe into the first gripper while imparting sufficient resistance to rearward movement of the pipe to prevent withdrawal of the pipe from the first gripper, and wherein the second gripper has an opening aligned with the second pipe port opening and wherein the second gripper includes one or more reverse serrations that can flex when a pipe is passed through the second gripper opening permitting forward advancement of the pipe into the second gripper while imparting sufficient resistance to rearward movement of the pipe to prevent withdrawal of the pipe from the second gripper; and a stiffener positioned within the inner casing and the first and second gripper openings and aligned with the first and second pipe port openings, such that a pipe inserted into the first pipe port can pass through the inner casing over one end of the stiffener and through the first gripper, and a pipe inserted into the second pipe port can pass through the inner casing over another end of the stiffener and through the second gripper, wherein the stiffener has a first pair of sealing members and a second pair of sealing members, wherein each sealing member in the first pair of sealing members is positioned within a groove in an outer surface of the stiffener within the first gripper opening such that when a pipe is passed over the stiffener and sealing members at least one of the first pair of sealing members can contact an interior wall of the pipe to provide a seal between the pipe and the stiffener, wherein each sealing member in the second pair of sealing members is positioned within a groove in an outer surface of the stiffener within the second gripper opening such that when a pipe is passed over the stiffener and sealing members at least one of the second pair of sealing members can contact an interior wall of the pipe to provide a seal between the pipe and the stiffener, and wherein each pair of sealing members have different diameters and the grooves have the same dimensions.

11. The coupler according to claim 10, wherein the first and second pipe ports further comprise at least one gusset positioned on the elongated lip around the port opening.

12. The coupler according to claim 10, wherein the pair of sealing members comprise elastomeric O-rings.

13. A coupler comprising:
an outer casing having first and second pipe ports each providing a passageway for a pipe to be passed into the outer casing, wherein each pipe port comprises an elongated lip and a port opening forming at least part of the passageway, the elongated lip being sufficient in length to align and straighten a pipe as it enters the passageway;
a hollow inner casing positioned within the outer casing and having a first opening and a second opening, wherein a first inner casing opening is aligned with the first port opening and the second inner casing opening is aligned with the second port opening;
first and second grippers positioned within the inner casing, wherein the first gripper has an opening aligned with the first pipe port opening and wherein the first gripper includes one or more reverse serrations that can flex when a pipe is passed through the first gripper opening permitting forward advancement of the pipe into the first gripper while imparting sufficient resistance to rearward movement of the pipe to prevent withdrawal of the pipe from the first gripper, and wherein the second gripper has an opening aligned with the second pipe port opening and wherein the second gripper includes one or more reverse serrations that can flex when a pipe is passed through the second gripper opening permitting forward advancement of the pipe into the second gripper while imparting sufficient resistance to rearward movement of the pipe to prevent withdrawal of the pipe from the second gripper; and
a stiffener positioned within the inner casing and the first and second gripper openings and aligned with the first and second pipe port openings, such that a pipe inserted into the first pipe port can pass through the inner casing over one end of the stiffener and through the first gripper, and a pipe inserted into the second pipe port can pass through the inner casing over another end of the stiffener and through the second gripper, wherein the stiffener has a first set of at least three sealing members and a second set of at least three sealing members, wherein each sealing member in the first set of sealing members is positioned within a groove in an outer surface of the stiffener within the first gripper opening such that when a pipe is passed over the stiffener and sealing members at least one of the first set of sealing members can contact an interior wall of the pipe to provide a seal between the pipe and the stiffener, wherein each sealing member in the second set of sealing members is positioned within a groove in an outer surface of the stiffener within the second gripper opening such that when a pipe is passed over the stiffener and sealing members at least one of the second set of sealing members can contact an interior wall of the pipe to provide a seal between the pipe and the stiffener, and wherein the pair of sealing members have different diameters and the grooves have the same dimensions.

14. The coupler according to claim 13, wherein each of the first and second pipe ports further comprises at least one gusset positioned on the elongated lip around the port opening.

15. The coupler according to claim 13, wherein each set of sealing members comprise elastomeric O-rings.

* * * * *